US010782780B2

(12) United States Patent
Maheriya

(10) Patent No.: US 10,782,780 B2
(45) Date of Patent: *Sep. 22, 2020

(54) REMOTE PERCEPTION OF DEPTH AND SHAPE OF OBJECTS AND SURFACES

(71) Applicant: VasuYantra Corp., Milpitas, CA (US)

(72) Inventor: Kiran K. Maheriya, Milpitas, CA (US)

(*) Notice: Subject to any disclaimer, the term of this patent is extended or adjusted under 35 U.S.C. 154(b) by 345 days.

This patent is subject to a terminal disclaimer.

(21) Appl. No.: 15/893,439

(22) Filed: Feb. 9, 2018

(65) Prior Publication Data

US 2018/0239428 A1 Aug. 23, 2018

Related U.S. Application Data

(63) Continuation-in-part of application No. 15/728,379, filed on Oct. 9, 2017, now Pat. No. 10,528,815, which
(Continued)

(30) Foreign Application Priority Data

Dec. 27, 2017 (WO) ...................... PCT/US17/68532

(51) Int. Cl.
*G06F 3/01* (2006.01)
*G06F 3/0346* (2013.01)
*G06T 7/593* (2017.01)

(52) U.S. Cl.
CPC .............. *G06F 3/014* (2013.01); *G06F 3/012* (2013.01); *G06F 3/016* (2013.01); *G06F 3/0346* (2013.01);
(Continued)

(58) Field of Classification Search
None
See application file for complete search history.

(56) References Cited

U.S. PATENT DOCUMENTS 6,474,159 B1 11/2002 Foxlin
9,024,874 B2 5/2015 Stretten
(Continued)

FOREIGN PATENT DOCUMENTS

WO WO-2015083183 A1 * 6/2015 ............. G06F 3/014

OTHER PUBLICATIONS

Klatzky, Lederman and Metzger, "Identifying objects by touch: An expert system", Perception and Psycophysics 1985, 37 (4) 299-302.
(Continued)

*Primary Examiner* — Jiangeng Sun
(74) *Attorney, Agent, or Firm* — Stephen E. Zweig

(57) ABSTRACT

A computer implemented method of mobile visual assistance to allow users to rapidly distinguish distances to and shapes of multiple objects. 3D images of the environment are obtained using a plurality of user worn video sensors, such as head mounted video cameras. The users are often equipped with a glove like device comprising pointing direction sensors and various haptic transducers. As the user moves though the environment, computer processors use the video sensors to detect various objects in front of the user and report these using secondary or coarse level haptic transducers. The user can use the glove-like device to point at various objects of specific interest, and the system can report further information such as shape or texture data using primary haptic transducers, allowing the user the haptic version of a sharper narrow field of view superimposed on a haptic version of a wider peripheral field of view.

17 Claims, 12 Drawing Sheets

Related U.S. Application Data is a continuation-in-part of application No. 15/411,837, filed on Jan. 20, 2017, now Pat. No. 9,792,501.

(60) Provisional application No. 62/471,293, filed on Mar. 14, 2017, provisional application No. 62/441,284, filed on Dec. 31, 2016.

(52) U.S. Cl.
CPC ...... G06T 7/593 (2017.01); *G06F 2203/0331* (2013.01)

(56) References Cited

U.S. PATENT DOCUMENTS

| | | | | |
|---|---|---|---|---|
| 9,792,501 | B1* | 10/2017 | Maheriya | G06K 9/00671 |
| 2008/0170118 | A1* | 7/2008 | Albertson | A61H 3/061 |
| | | | | 348/46 |
| 2010/0009753 | A1* | 1/2010 | Stern | A63F 13/06 |
| | | | | 463/36 |
| 2014/0184384 | A1* | 7/2014 | Zhu | G09B 21/003 |
| | | | | 340/4.12 |
| 2014/0252236 | A1* | 9/2014 | Cottrell | G01C 3/04 |
| | | | | 250/341.8 |
| 2014/0371871 | A1* | 12/2014 | Farina | B25J 9/1612 |
| | | | | 623/24 |
| 2015/0077234 | A1* | 3/2015 | Fullam | G09B 21/003 |
| | | | | 340/407.1 |
| 2016/0019817 | A1* | 1/2016 | Deokar | G08B 6/00 |
| | | | | 340/4.12 |
| 2016/0107572 | A1* | 4/2016 | Weller | B60R 1/00 |
| | | | | 348/36 |
| 2016/0309143 | A1* | 10/2016 | Fu | H04N 5/2256 |
| 2016/0313561 | A1* | 10/2016 | Chenchev | G02B 27/0179 |
| 2017/0161720 | A1* | 6/2017 | Xing | G06Q 20/3278 |
| 2020/0019245 | A1* | 1/2020 | Ganadas | G06F 3/014 |

OTHER PUBLICATIONS

Ikeda and Uchikawa, "Integrating time for visual pattern perceiption and a comparision with the tactile mode", Vision Research 18, pp. 1565-1571, 1978.

Garbin and Bernstein, "Visual and haptic perception of three-dimensional solid forms", Perception & Psychophysics 1984, 36 (2) 104-110.

Velazquez, "Wearable assistive devices for the blind", LNEE 75, Springer, pp. 331-349, 2010.

* cited by examiner

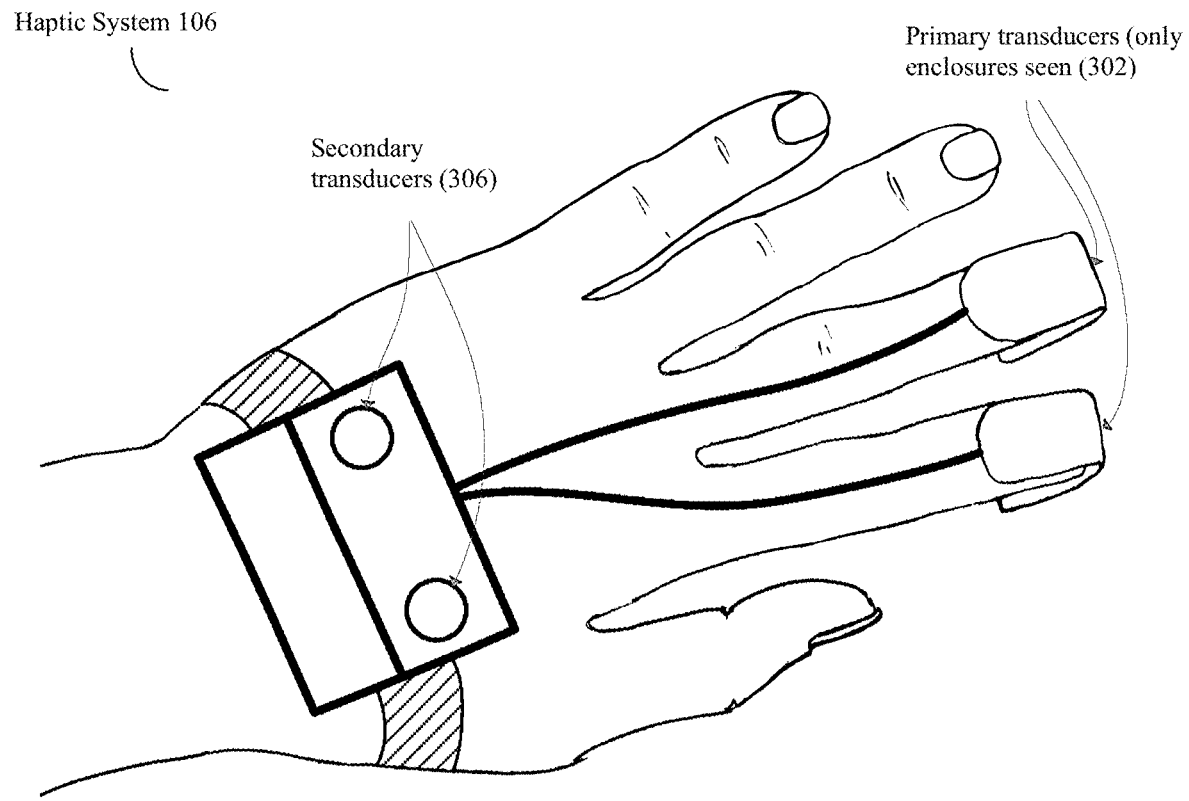

Camera sensors 402

NIR LED 404

Haptic transducers (406)

Vision/haptic system enclosure (400)

Fig. 6A
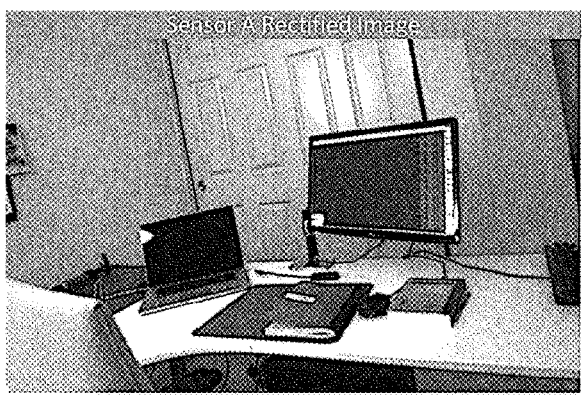
Fig. 6B
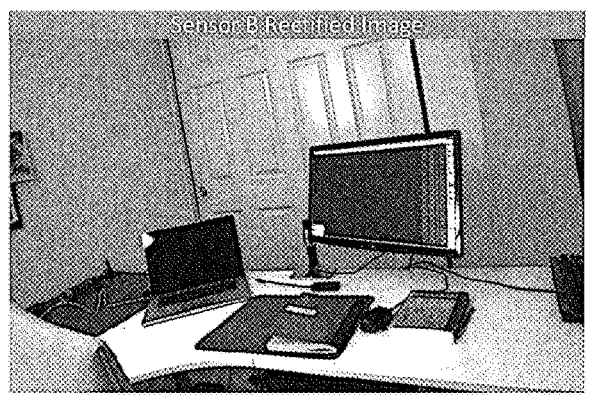
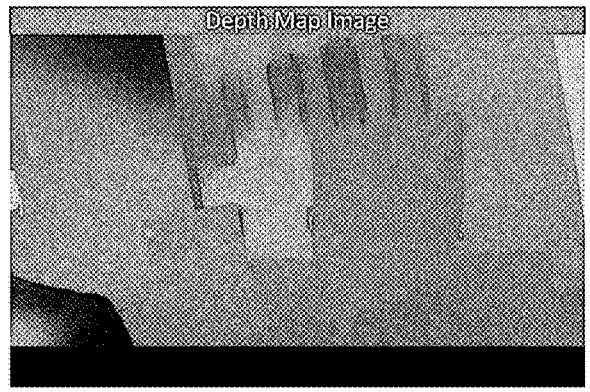
Fig. 6C

Fig. 8A        Fig. 8B
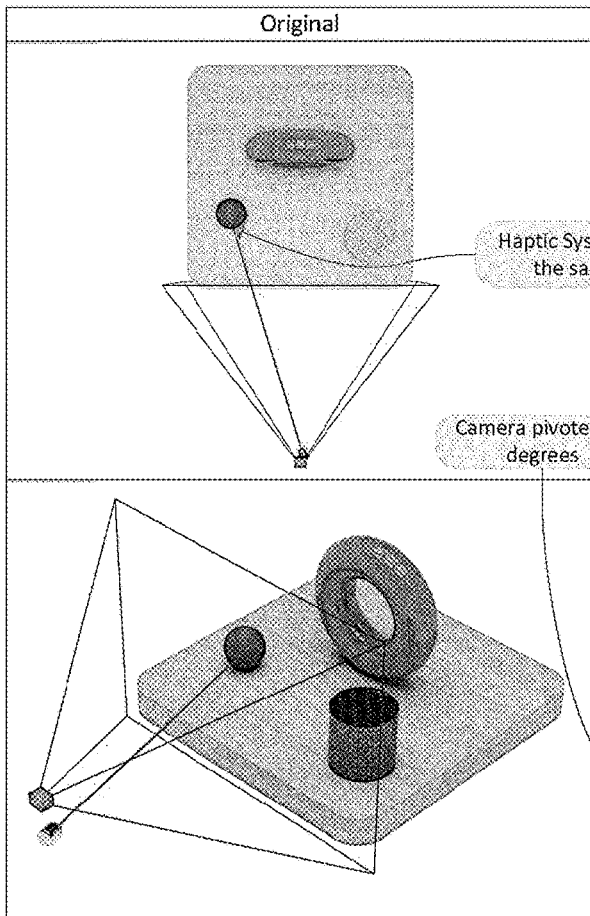
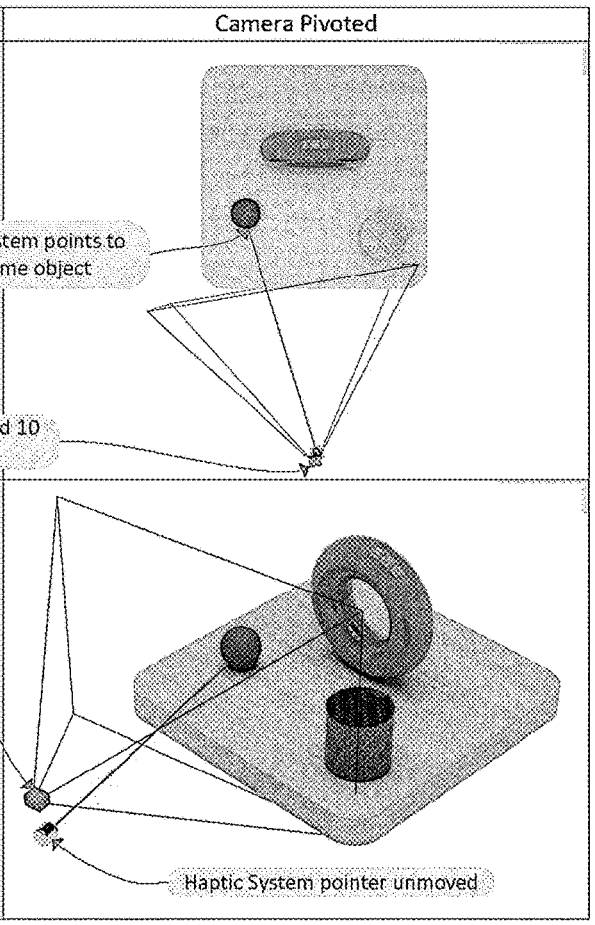
Fig. 8C        Fig. 8D

Fig. 9A                    Fig. 9B
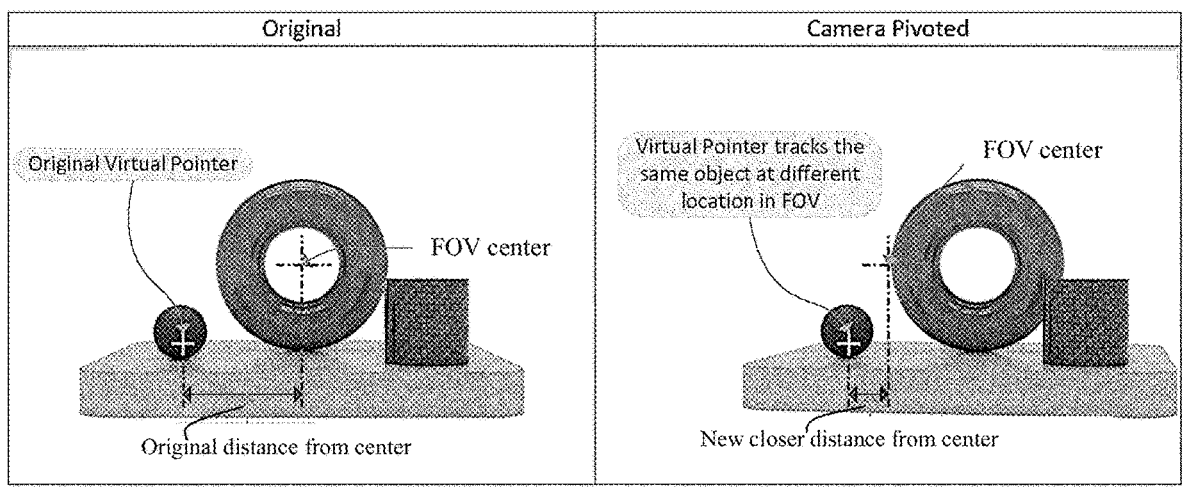

Fig. 10A
Fig. 10B
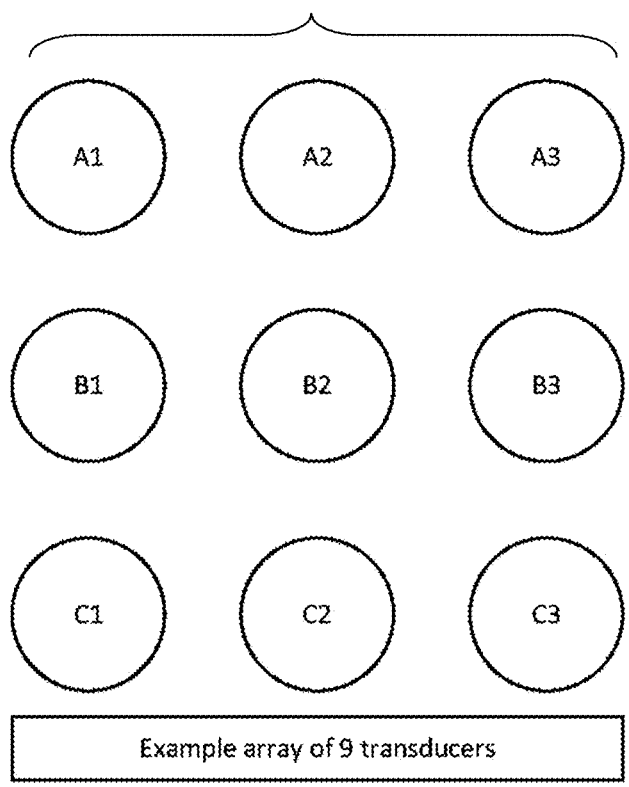
Example array of 9 transducers
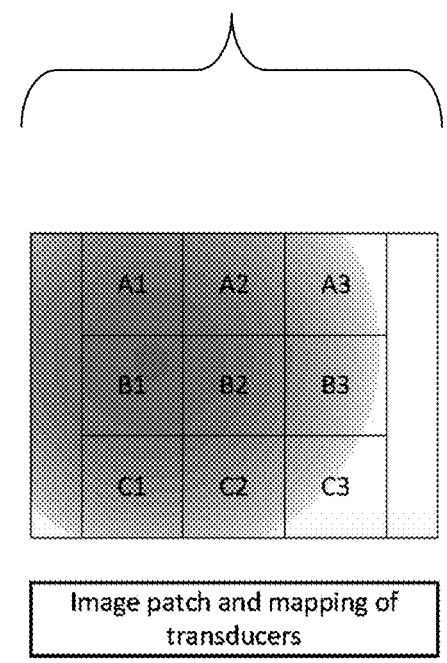
Image patch and mapping of transducers Fig. 12A
Fig. 12B
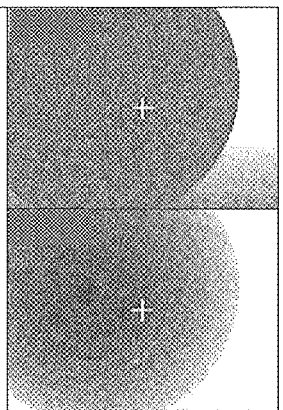
Fig. 12C
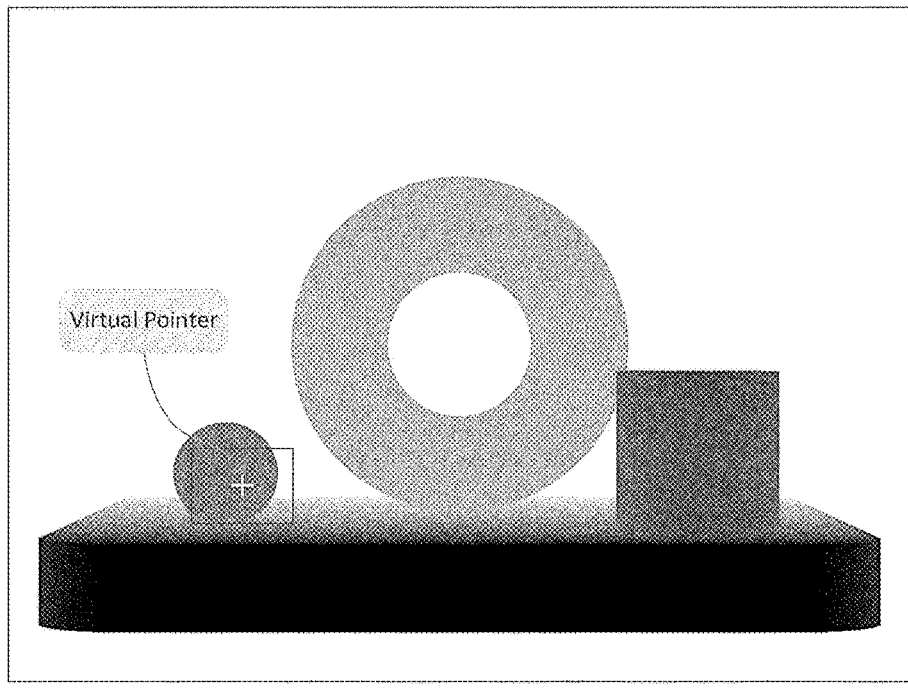

REMOTE PERCEPTION OF DEPTH AND SHAPE OF OBJECTS AND SURFACES

CROSS REFERENCE TO RELATED APPLICATIONS

This application claims the priority benefit of U.S. provisional patent application 62/471,293, filed Mar. 14, 2017; this application is also a continuation in part of U.S. patent application Ser. No. 15/728,379, filed Oct. 9, 2017; application Ser. No. 15/728,379 was a continuation in part of U.S. patent application Ser. No. 15/411,837, filed Jan. 20, 2017, now U.S. Pat. No. 9,792,501; application Ser. No. 15/728, 379 also claimed the priority benefit of U.S. provisional patent application 62/441,284, filed Dec. 31, 2016; the complete contents of all of these applications are included herein by reference.

BACKGROUND OF THE INVENTION

Field of the Invention

This invention is in the field of computerized visual assistance devices for the visually impaired

Description of the Related Art

According to a WHO 2010 global survey, the number of people who are visually impaired is "estimated to be 285 million, of whom 39 million are blind". Per the 2000 US census, 3.4 million Americans had blindness or low vision, and this number is estimated to increase by about 70% by the year 2020. Even accounting only for adults age 40 and above, there are about 1.3 million blind people, and this number is projected to grow to 2.1 million by 2030.

However, many other people experience functional limitations due to vision loss, even though they do not meet the criteria for legal blindness. Even relatively mild vision impairment can affect the performance of everyday tasks such as driving, reading, and walking. When more broadly defined as visual problems that hamper the performance and enjoyment of everyday activities, other recent estimates indicate that almost 14 million Americans are visually impaired. If visually impaired people could carry out their day-to-day activities like the people with normal vision, their chance of having a better quality of life will also improve.

Walking with confidence is a prime need for visually impaired (VI) people. This not only lets them make sense of the environment, it builds their confidence and allows greater independence. In this regard, various electronic methods, involving electronic haptic transducers and/or machine vision methods have been proposed. These include the methods of Gassert US 2013/0220392, Stetten US 2008/0226134, Zeleck US 2013/0218456, and Zhu US 2016/0321955.

Computer vision methods: There has been a substantial improvement in computer vision algorithms in the past decade. The advent of machine learning techniques—specialized algorithms as part of artificial intelligence—has both made the computer vision more accurate, and it has also increased the ability of computer vision methods to recognize more objects in the environment in real time. Some of these recent advances in computer vision methods are exemplified by W. Liu, D. Anguelov, D. Erhan, C. Szegedy and S. Reed, "*SSD: Single Shot MultiBox Detector*" arXiv preprint arXiv:1512.02325, 2015, and J. Redmon, S. Divvala, R. Girshick and A. Farhadi, "*You Only Look Once: Unified, real-time object detection*" arXiv preprint arXiv: 1506.02640, 2015.

Other computer vision methods include convolutional neural networks (ConvNets), which have outperformed classic computer vision algorithms in terms of speed as well as performance. Such methods are exemplified by A. Krizhevsky, I. Sutskever and G. E. Hinton, "*ImageNet Classification with Deep Convolutional Neural Networks,*" Advances in neural information processing systems, 2012; and others.

Steffen, in U.S. Pat. No. 9,024,874, described a fingertip mounted combination haptic simulator and image sensing device.

Foxlin, U.S. Pat. No. 6,474,159, teaches a motion tracking system.

BRIEF SUMMARY OF THE INVENTION

In some embodiments, the invention may be a system, method, and device for remote perception of depth and shape of objects or surfaces using haptic feedback. Although the invention can be used by human users with normal vision, the invention will be particularly useful for visually impaired persons or other situations when normal human vision is not available. The main idea behind this device is to enable perception of the shape of objects around the user without requiring touching them (e.g. remote perception).

People with normal vision can scan the environment around them visually to get information necessary to walk around or interact with objects due to visual perception. For example, simply by looking at a distant wall with an open door, a person with normal vision would acquire the information about where the exit/entrance is, including distance from it.

This intuitive navigation method using visual perception is, unfortunately, not available to the visually impaired. Similarly, such visual information is also not available in many circumstances that rescue workers, e.g., firefighters, encounter. A device that can provide such perception of an object including the objects' shape and depth can truly transform the lives of visually impaired and can also be a life-saver for rescue workers. Such a device would perform sensory substitution—by changing the information originally in the form of visual sensation to that in the form of haptic feedback.

Visual and haptic systems of the brain represent shape information in the same way. In addition, haptic discrimination is known to improve with practice. What is required, then, is an intelligent way of processing the visual information and then translating it in the form of haptic or tactile information.

Without using vision, humans can identify objects by touching them by hands; commonly known objects can be identified with even higher accuracy. Visually impaired, especially blind, are accustomed to perceiving the shapes of objects by touching them by hand. However, this is practical only in known environments and only at close range where objects can be touched.

We describe a device that enables remote perception of shape of objects using haptic feedback without requiring touching the objects. This device performs sensory substitution of vision (in a limited capacity); replacing it by perception through haptic feedback. The haptic feedback is created based on shape, depth and other information about the object or surface gathered from processing of visual information. Haptic perception does not have the fine resolving power of the visual perception; however, it does provide sufficient sensory input to the visually impaired user to perceive the shape and depth of the objects or surfaces to be able to interact confidently with the surrounding environment.

The concept of remote shape and depth perception is best explained using an example: Imagine a user standing in the room. The user can scan the room by moving the hand that is wearing the device—quite similar to pointing with a laser pointer—albeit an invisible "virtual pointer" in this case. In an alternative implementation, the user can simply use the head movement to point to the object/surface (similar to the manner in which people with normal vision scan with head or eye movements). The object/surface thus pointed by the "virtual pointer" will be recognized by the device and haptic feedback will be provided to let the user perceive its shape. This will be a three-dimensional (3D) perception: Apart from the sensation of the two-dimensional (2D) shape features, a sense of depth or distance will also be conveyed to complete the 3D perception. In this example, the user will be able to:

1) Perceive, e.g., a wall in the room, and subsequently,
2) As the hand moves over the opening in the wall in the form of an open door, perceive the opening as well.

Once the user has perceived the object (the open door in this example), they can decide to approach the object by walking in the direction of it or scan for other objects, and repeat the process intuitively. The remote shape perception provided by the device is continuous and dynamic to enable the user to move around freely in real world—indoors or outdoors—and interact with objects without requiring touch.

Thus in some embodiments, the invention may be a device, system, or method of visual assistance for a human user in an environment. The invention will typically use a plurality of user worn video sensors to acquire 3D images of the environment and various objects in this environment. These objects will typically have object shapes and various object locations in 3D space. The invention will typically use using at least one pointing sensor, which may be mounted on the user's hand, head, or other body location, to determine a pointing direction (direction of user interest). This pointing direction will typically comprise a narrow angle pointing direction vector that is the pointing direction itself, surrounded by a wider region surface usually on either side of this pointing direction in the horizontal and vertical direction, thus forming a 2D patch.

The invention will typically use at least one computer processor, various computer vision distance determination algorithms, the 3D images of the environment, and the pointing direction to identify (relative to the user's location and orientation) objects near and far from the user, and if these objects are along the narrower pointing direction surface or in the wider pointing region surface.

The invention will also use its computer processor(s) and various haptic signatures, and/or haptic signature modifications, to assign object location haptic signatures to some or all of the various far pointing direction objects, far pointing region objects, near pointing direction objects, and near pointing region objects.

The invention then uses haptic methods to relay information pertaining to the status of these various objects to the user. It does this by using its at least one computer processor and various spatially separated, user worn, haptic transducers to map the various object location haptic signatures onto haptic outputs of the haptic transducers. The user can then sense these various haptic sensations, and obtain information pertaining to the status of various objects along the user's direction of interest, both near and far from the user. The user can also adjust the system to only report some of these various objects as desired.

BRIEF DESCRIPTION OF THE DRAWINGS

FIG. 3 shows an example embodiment of invention's haptic system as a haptic glove.

FIG. 6A, FIG. 6B, FIG. 6C show an example of stereo images and their corresponding depth map.

FIG. 8A, FIG. 8B, FIG. 8C, and FIG. 8D show how the invention's vision system may pivot while the invention's haptic system may remain fixed (unmoving).

FIG. 9A and FIG. 9B show an effect of a vision system pivot on the invention's virtual pointer.

FIG. 10A, FIG. 10B show an example of multiple transducers and mapping on the image patch.

FIG. 12A, FIG. 12B, and FIG. 12C show a depth map of an example scene, with a virtual pointer added for illustration.

DETAILED DESCRIPTION OF THE INVENTION

Figure 1:
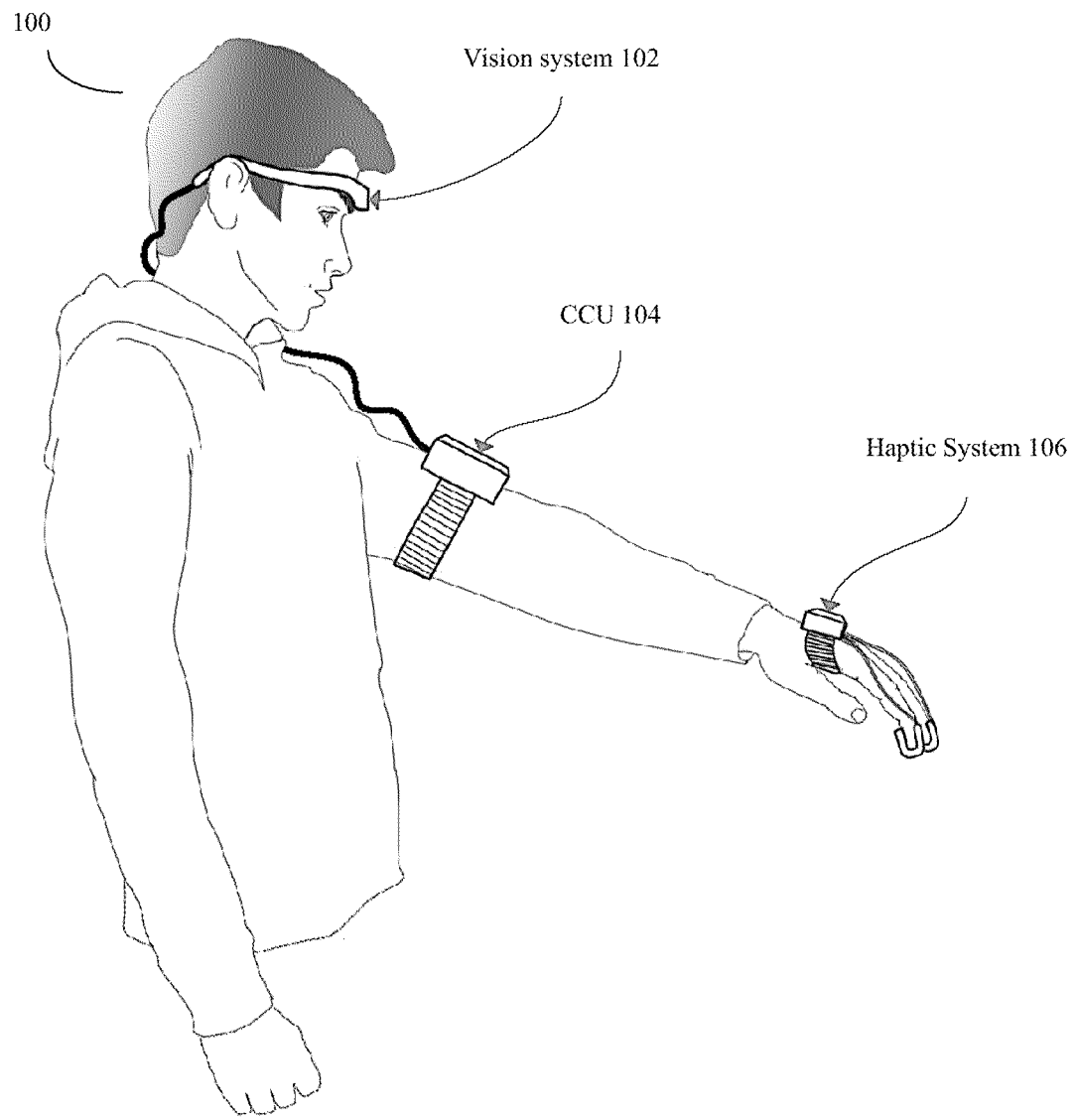
FIG. 1 shows an example implementation of the device with three physical components

Definitions:

Virtual pointer: direction of user interest as determined by various pointing sensors. Image patch: A narrow angle patch or surface in both the horizontal and vertical directions, with dimensions between about 1 degree to about 10 degrees in the horizontal and vertical, which surrounds the virtual pointer, and is somewhat analogous to the region of sharp vision in the human eye. Pointing direction: the image patch or surface designated by a particular pointing vector. As the image patch (surface) shrinks in size, the pointing direction tends to approximate the virtual pointer, and thus the terms are sometimes used interchangeably when the context is clear. Pointing region (also known as the field of view or FOV). A wider angle "patch" or "surface" typically surrounding both the virtual pointer and the pointing direction and the narrower "image patch". The field of view will often have dimensions between about 45 degrees to 180 degrees in both the horizontal and vertical, and is somewhat analogous to peripheral vision.

In some embodiments, the invention may thus comprise any of a system, device or method of visual assistance for a human user in an environment. The invention operates by using a plurality of user worn video sensors to acquire 3D images of the user's environment. This environment will generally comprise a plurality of different objects, each different object comprising an object shape and a different 3D object location.

The invention uses at least one pointing sensor to determine a user pointing direction (direction that the invention will use as the presumed direction of user interest). This direction of user interest will typically comprise a narrow angle surface encompassing the pointing vector, and a pointing region comprising a wider angle surface surrounding the pointing direction and the narrow angle surface.

For example, if the user is walking, and the pointing sensor(s) are monitoring the position of the user's head, the direction of user interest may be the direction that the user's head is pointed in. The narrow angle will often be a narrow angle 2D surface, such as the surface of a sphere perhaps 5-10 degrees wide in both 2D directions, surrounding the direction that the user is gazing at, or has been walking along (not unlike the narrow angle of clear vision of the human eye). If the pointing sensors are monitoring the position of the patient's hand, the direction of user interest may be the direction that the user is pointing at.

The wider angle surface can correspond to a wider angle 2D surface surrounding the narrow angle surface, such as the surface of a sphere 45 degree, 90 degree angle, 120 degree, or even 180 degree angle in both 2D directions, and can be viewed as being similar to the wider angle of less sharp peripheral vision of normal human eyes.

The invention operates by using at least one computer processor, compute vision distance determining algorithms, the pointing sensors, and the 3D images of the environment to analyze distances to various objects. The invention will typically use these 3D images of the environment to identify, along the pointing direction and pointing region, and relative to the location of the user various objects, here designated far pointing direction objects, far pointing region objects, near pointing direction objects, and near pointing region objects.

The invention then uses its computer processor and a variety of different haptic signatures (such as a database of haptic signatures) to assign object location haptic signatures to any of these far pointing direction objects, far pointing region objects, near pointing direction objects, and near pointing region objects. The invention will then use its one or more computer processors and a plurality of spatially separated user worn haptic transducers, to map these various object location haptic signatures onto haptic outputs of these haptic transducers. This lets the user use the sensations produced by the various haptic transducers to sense the user's local environment, and help distinguish among these various objects. The user can also monitor how these sensations vary according to the direction of user pointing, and this can help the user construct a mental map of the user's environment.

In some embodiments, the invention may be viewed as having three main functional components: The invention may be viewed as having a vision input component (plurality of user worn video sensors), a central computing unit (CCU) (one or more computer processors) component, and a haptic rendering component that includes various user worn haptic transducers. Although it helps simplify the discussion to discuss the various components separately, this particular example is not intended to be limiting.

Put alternatively, most of this document teaches an embodiment where the invention comprises three physical units in the form of the vision system containing some or all of the user worn video sensors, CCU containing some or all of the various computer processors, and the haptic system containing various spatially separated user worn haptic transducers (all three described in detail shortly) as a typical embodiment. FIG. 1 shows an example implementation of a human user (100) wearing the device with these three main assemblies—vision system (102), CCU (104), and Haptic System (106).

Figure 2:
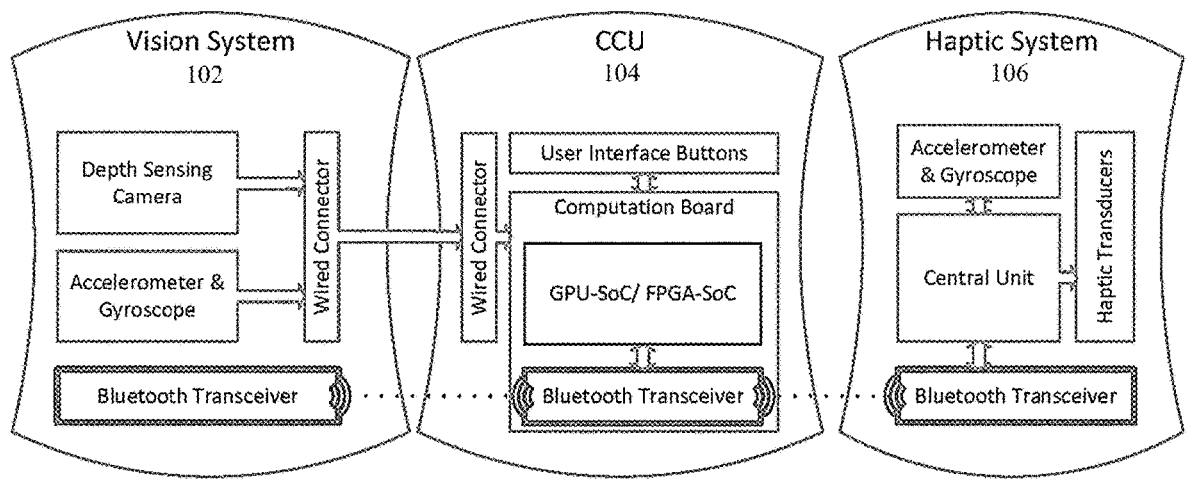
FIG. 2 shows a high level block diagram of the device.

Note that although the particular groupings of components to form the assemblies shown in FIGS. 1-3 represent one useful embodiment of the invention, this particular embodiment is not intended to be limiting. As will be discussed, the invention's video cameras (video sensors) need not be worn on the user's head, the invention's computer processors need not be packaged in a separate CCU unit, and the invention's haptic sensors need not be packaged with the invention's pointing sensors.

These implementations can be powered by a battery (preferably a rechargeable battery). In some implementations, more batteries will be added to power those components that are not otherwise wired to the main battery.

As the user points or gazes at various objects or surfaces in the real world, pointing sensors determine the direction of user interest. The system operates so that haptic feedback continuously provides the perception of the shape and depth of the object/surface. One can compare one embodiment of the invention as providing functionality intended to reproduce some of the sensations of touching an object and then moving the hand around to feel the shape of the object; except that with this device, the user will not have to touch the object. Instead, with appropriate pointing sensors, the user can simply point at an object/surface for remote perception provided by the device using the Haptic System.

FIG. 2 shows one possible high-level block diagram of the device showing one way in which the various system sub-components can be packaged into three main assemblies, here following the design choices previously discussed in FIG. 1. Note that all the Bluetooth transceivers in the figure for purposes of communicating data between the three main assemblies shown here are optional and can be replaced by wired connections.

All three main components are described next.

Vision System

One embodiment of the vision system can be worn on the forehead, either near or above the eyes, like glasses, to capture the scene from the point of view of what a person with normal vision would see. In this embodiment, the invention's video sensors can be spatially separated video sensors (e.g. video cameras) configured to be worn on the user's head.

An alternative implementation is to design the system so that at least some video sensors (e.g. video cameras) are configured like a badge to wear on the user's torso or shoulder. In some embodiments, at least some video sensors could even be configured to be worn on the user's hands as a glove-like device.

The vision system captures continuous stream of vision information and sends it to the CCU (e.g. at least one computer processor). This can be accomplished by using two or more two-dimensional (2D) image sensors (here termed a plurality of user worn video sensors/cameras) to capture the video and sending it to the CCU (computer processor); In this case, the CCU extracts and processes the 2D images and computes depth information of the scene (depth map) per frame by using various computer vision distance algorithms.

In these embodiments, the computer vision and distance algorithms can comprise stereo image rectification and depth map computation algorithms. These computer vision methods may, for example, comprise any of geometric modelling methods, convolutional neural network methods, and single shot multibox detection SSD frameworks.

Alternatively, the vision system may itself contain at least one computer processor, and provide a video stream of a depth map and a reference 2D image per frame directly to other computer processors located in the CCU. In this case the CCU processors will not have to do depth map computation, and instead can just extract depth map and the reference 2D image per frame from the incoming video. This alternate embodiment may also use a time-of-flight camera or a structured light camera to provide depth information instead of stereopsis based depth map generation.

In some embodiments, the vision system may also contain pointing sensors, such as one or more accelerometers and/or gyroscopes to track its movement and orientation. This can produce a pointing direction output which can be read by CCU (computer processors) when the algorithms require it. Alternatively, with the appropriate computer vision software, video camera output from the vision system can also be used to determine direction. The pointing sensors can also be mounted separately from the vision system.

As will be discussed in more detail later in this disclosure, the CCU can use a combination of such pointing sensors, along with possibly additional pointing sensors in the Haptic System (which may be mounted on the user's hand in a glove like manner), to track the orientation and movement of the Vision system and Haptic System relative to each other to create a "virtual pointer" inside the images captured by the Vision system as pointed to by the Haptic System.

In some embodiments, the invention may further employ image recognition algorithms, such as any of convolutional neural network methods, geometric modelling methods, and single shot multibox detection SSD frameworks.

Use of Convolutional Neural Network (ConvNet) Methods for Object Detection

Object detection is a well-known problem in computer vision and artificial intelligence research. Object detection, in fact, involves solving two other problems as sub-problems:

Localization: This task locates one or more objects in an image, and determines where the object(s) are and what shape they are. This answers the question "where is the object?"

Classification: This task classifies the categories of one or more prominent objects in an image. This is also known as the recognition task. This answers the question, "what is the object?"

Object detection requires using the above two techniques for multiple objects, thereby detecting the existence of potentially multiple objects in the scene, localizing (e.g. often using a bounding box), and classifying at least some of detected objects.

Various computer vision methods may be used for the invention. These include the methods of P. Viola and M. Jones, "Rapid object detection using a boosted cascade of simple features," in Proceedings, IEEE Conference on Computer Vision and Pattern Recognition, 2001.

However, in some embodiments, convolutional neural methods, such as AlexNet type methods (A. Krizhevsky, I. Sutskever and G. E. Hinton, "ImageNet Classification with Deep Convolutional Neural Networks," Advances in neural information processing systems, 2012) may be used. In particular, Deep Learning using convolutional neural networks (ConvNets) methods can be useful, because these methods are able to "learn" the features from images as they are trained, and can also be used to include other required tasks like classification and localization as part of the single network. Examples of this latter approach are taught by R. Girshick, J. Donahue, T. Darrell and J. Malik, "Region-based convolutional networks for accurate object detection and segmentation," IEEE transactions on pattern analysis and machine intelligence 38.1, 2016; R. Girshick, "Fast R-CNN," Proceedings of the IEEE International Conference on Computer Vision, 2015; and P. Sermanet, D. Eigen, X. Zhang, M. Mathieu, R. Fergus and Y. LeCun, "Overfeat: Integrated recognition, localization and detection using convolutional networks," arXiv preprint arXiv:1312.6229, 2013.

The ConvNet can be thought of as being split into a feature extractor and a classifier; with the final output layer producing the actual desired output (e.g., identification and classification of objects). An image dataset can be used to train the network. Here the CovNet can be trained as to what objects are significant, what objects are insignificant, what objects to attempt to identify, and what objects to simply report as generic objects.

The ConvNet is typically initialized using an architecture-defined method (e.g., random initialization) before starting the training. During what is known as the forward propagation stage, the output of the ConvNet is calculated based on current values of the parameters of the ConvNet. This output is then compared against the image labels (also known as ground truth) to calculate the loss (or error); the larger the loss, the larger the deviation from ground truth.

The backward propagation stage of the training uses this loss value to change the parameters of the network with the intention of reducing the loss. Here Stochastic Gradient Descent (SGD) algorithms for back propagation may be used, such as those taught by L. Bottou, "Stochastic gradient learning in neural networks" Proceedings of Neuro-Nimes, vol. 91, no. 8, 1991; and Y. LeCun, L. Bottou, Y. Bengio and P. Haffner, "Gradient-based learning applied to document recognition" Proceedings of the IEEE, 1998.

In these methods, this process of forward propagation (or inference) followed by back propagation is repeated until the loss becomes very small. At that point, the network is considered trained.

This trained network may then be used to generate the detection output by simply performing a forward propagation (inference) stage.

Recent work now enables such methods to detect objects in real-time. Here methods such as S. Ren, K. He, R. Girshick and J. Sun, "Faster R-CNN: Towards real-time object detection with region proposal networks" Advances in neural information processing systems, 2015; J. Redmon, S. Divvala, R. Girshick and A. Farhadi, "You Only Look Once: Unified, real-time object detection" arXiv preprint arXiv:1506.02640, 2015; and W. Liu, D. Anguelov, D. Erhan, C. Szegedy and S. Reed, "SSD: Single Shot Multi-Box Detector," arXiv preprint arXiv:1512.02325, 2015 may be used.

In some embodiments, a convolutional neural network based object detection framework method known as a Single Shot multibox Detection (SSD) framework, as described by (W. Liu, D. Anguelov, D. Erhan, C. Szegedy and S. Reed, "SSD: Single Shot MultiBox Detector," arXiv preprint arXiv:1512.02325, 2015) may be used. Since often only a small range of objects need to be identified for navigational purposes, these methods may be further modified by replacing the ConvNet used by previous SSD methods with a fine-tuned, smaller network, thus producing the object detection of object classes (often navigationally important object classes) that are specific for the invention.

Central Computing Unit (CCU)

In some embodiments, some or all computation can be done with most of the computer processing power packaged in a CCU assembly, however this is not intended to be limiting. Thus the CCU functions described herein can be implemented by at least one processor located essentially anywhere on or near the user. Some computational functions may even be done remotely.

However in some embodiments, the CCU is the brain of the device—it will typically comprise at least one computer processor that performs most of the computation for the device. The CCU may be implemented in any of the following ways: 1) as a separate physical unit, 2) as implemented inside the vision system, or 3) as implemented inside the Haptic System, 4) as any computer processor located on or near the user. Here, even smartphone processors, and a suitable wired or wireless connection to the invention's various sensors and haptic transducers, may also be used.

One option for the CCU implementation is a custom hardware board with a suitably powerful system-on-chip (SoC) device with a GPU (Graphics Processing Unit) or an FPGA (Field Programmable Gate Array); however, the CCU functionality can also be implemented by a powerful smartphone if it can perform all the functions at proper speed. Note that in this discussion SoC, GPU, and FPGA devices will also be referred to as "computer processors".

Producing 3D images of the user's environment: Typically the vision system will contain at least two spatially separated video cameras, each producing at least partially overlapping 2D images of the user's environment. Together the video cameras produce 2D stereo images of the user's environment. These 2D stereo images thus contain 3D image information regarding the user's environment, and such 2D stereo images are considered to be 3D images of the user's environment.

The CCU or equivalent computer processors either computes the depth map using the 2D stereo images obtained from the video sensors, or it can work directly on the depth map and a reference 2D image obtained from the vision system after at least some computer preprocessing at the vision system.

Often the CCU processors further process the depth map and the corresponding reference 2D image, often on a per frame basis. The CCU processors can also run various algorithms necessary to convert the visual information into haptic output for the Haptic System.

The CCU sends the haptic output to drive the haptic transducers (sometimes via intermediate haptic driver chips) on the haptic system using any of a wired or wireless connection. For example, in some embodiments, the CCU can send the haptic signatures or other haptic output to the haptic system's haptic transducers using a wireless connection (e.g. Bluetooth). In this later embodiment, the haptic system may additionally require a battery and a Bluetooth or other type wireless transceiver.

Haptic System

Although in the most general embodiment, the haptic system can comprise any haptic transducers configured to come into contact with the user's skin, often the haptic system will comprise primary haptic transducers and secondary haptic transducers. The invention will often be configured so to use it's at least one computer processor to map object location haptic signatures from at least nearby objects that the user is pointing at (near pointing direction objects) onto the primary haptic transducers. One type of haptic system is shown in FIG. 3.

In many but not all of the embodiments discussed here, the haptic system assembly (106) may also comprise at least one pointing sensor as well, such as the accelerometer/gyroscope units shown in FIG. 2 (106) However these examples are not intended to be limiting.

The main tasks of the haptic system are:

a. In some embodiments, if pointing sensors are configured with hand mounted haptic transducers, enable the user to point at objects or surfaces in the real world.

b. Regardless of where the pointing sensors are configured, provide haptic perceptions of shape and depths of various objects and surfaces in the current pointing direction.

c. Optionally (and additionally), provide a broader (macro-level) location and depth perception of other nearby objects/surfaces, using a set of additional transducers to give the user a sense of the user's orientation relative to other objects within the environment. This again can be viewed somewhat as being the haptic analog to peripheral vision.

FIG. 3 shows an example embodiment where the haptic system (various haptic transducers) are configured as a haptic glove like device intended to be worn on at least one hand of a user. In some embodiments, this glove like device may also include at least one pointing sensor as well (see FIG. 2, 106).

In FIG. 3, the glove-like device has two primary transducers (302) configured on the end of the user's fingers. Note that in FIG. 3, the term "glove like device" means only that at least one finger is at least partially covered by at least one haptic transducer, and that there is a band covering the back portion of the user's hand that contains other components. There is no requirement that the user's entire hand or all of the user's fingers and/or thumb be covered, only that at least one portion of the user's hand be covered.

Note that in FIG. 3, at least some of the haptic transducers comprise secondary haptic transducers (306) configured to provide haptic input to regions of the user's arm or hand that exclude the user's fingers and thumb.

The haptic system can, in some embodiments, be an internally or externally powered device that does not do any complex processing and may optionally contain various both haptic transducers, and also various haptic electrical driver circuitry. In some embodiments, ASIC (Application Specific Integrated Circuit) chips can be used to drive the haptic transducers depending on the output provided by the CCU. In other embodiments, the CCU (or processor) output may drive the haptic transducers directly.

In some embodiments, the CCU may have its own battery. In other embodiments, an external battery can provide power to the haptic system. As mentioned earlier, in some embodiments, the haptic system can be designed in the shape of a glove worn over a hand, and the CCU processors and optional battery can be designed to be worn as a device clipped to a waist belt, or worn on the user's upper or lower arm with a band like enclosure.

In other embodiments, both the CCU processors and the haptic system can be designed to be worn by the user as a sleeve and a glove-like combination that can contain both the CCU and the haptic system.

Note that irrespective of the distribution of the computation resources and power sources among the CCU and the haptic system, the algorithms themselves remain the same and are described in the rest of the document.

In some embodiments, the haptic system can use a wireless transceiver, such as a Bluetooth transceiver, to receive information from the CCU and can use a rechargeable battery to power itself. The CCU can also use its own Bluetooth transceiver to communicate with the haptic system. The haptic system may also contain one or more computer processors. These can be standard computer processors, System on Chip (SoC devices), custom ASIC chips, and the like, which can be configured to perform some or all system functions, ranging from merely performing certain algorithms directly related to haptic perception and output, to implementing all of the invention's various image processing activities as desired.

Haptic Transducers

To provide haptic feedback, the haptic system will typically contain multiple vibro-tactile (haptic) transducers. These can be of multiple types, and can, for example, be ERM (Eccentric Rotating Mass) haptic transducers, LRA (Linear Resonance Array) haptic transducers, Piezo elements or electroactive polymers (EAP) haptic transducers, and other types of haptic transducers as desired. The main criterion is that the haptic transducer should produce detectable haptic sensations on the user's skin.

The position of the haptic transducers is another important consideration. The more that the user can detect a wide variety of different haptic sensations, the more haptic information can be relayed to the user. However a human's ability to discriminate stimuli on the skin varies throughout the body, and thus with regards to haptic transducer placement, some parts of the body are much better than other parts of the body.

Here, useful insights can be obtained by using the two-point discrimination threshold (TPDT) as a measure that represents how far apart two pressure points must be in order to be perceived as two distinct points on the skin. This measurement informs us how close the haptic transducers can be placed while maintaining distinct identification of effects produced by each transducer. This measure is important for the invention's multi-haptic transducer methods.

In this regard, the user's fingers have the smallest TPDT, and the fingers also have higher sensitivity to haptic sensation. This is important for detecting finer level of details, such as textures and hard/soft edges. Thus in a preferred embodiment, the invention can make use of two or more primary haptic transducers, which can be placed on a single or multiple fingers of the user's hand (and often held in position using the invention's glove like device), for purposes of object shape and depth perception, particularly along the direction of user interest (pointing direction). Using normal human sight as an analogy, these can be compared to the relatively narrow area of sharp vision.

Additionally, in some embodiments, the invention can also employ two more secondary transducers to provide haptic feedback for spatial location and depth of other nearby objects/surfaces that surround the area/region pointed to by the user. Using normal human sight as an analogy, these can be compared to the much wider area of peripheral vision that typically surrounds the region of sharp vision.

Thus in these embodiments, least some of the haptic transducers comprise primary haptic transducers. As will be discussed in more detail shortly, the invention will often operate by using at least one computer processor and computer vision image recognition algorithms to analyze a shape of at least those nearby objects that the user is pointing at (near pointing direction objects). At least for larger objects, these objects may have multiple portions. For example, an open "door" object will have sharp corner portions on the sides and top. A "bed" object will often have rounded sides, and so on.

The invention will often use its computer processor and computer vision image recognition algorithms to analyze at least portions of those nearby objects that the user is pointing at (near pointing direction objects) against various reference shapes. It can at least identify sharp edges and rounded edges, for example.

The system's processors can then assign these corresponding reference shapes to at least portions of these near pointing direction objects. As will be discussed, typically each reference shape can have a corresponding shape haptic signature. This haptic signature can be generated by various methods, but for simplicity we will say that this corresponding shape haptic signature can be selected from the database of haptic signatures.

The invention will then use its computer processor(s), the corresponding reference shape(s), and one or more specific haptic signatures selected from this database of haptic signatures to assign at least one object shape haptic signature to at least portions of those nearby objects that the user is pointing at (near pointing direction objects). If the user is pointing at a door jamb, then the haptic signatures might be those assigned to straight vertical, and relatively "sharp" objects, for example, so that the user can feel the shape of the door jamb at a distance. In this example, to allow the user to detect this, the invention will use its computer processor and haptic transducers to map the appropriate object shape haptic signature(s) onto the haptic outputs of the primary haptic transducers.

Thus put alternatively, in some embodiments, the invention may employ haptic transducers that are both primary haptic transducers and secondary haptic transducers. In these embodiments, the invention will use its one or more computer processors to map various object location haptic signatures onto these transducers. For example, the invention may map nearby objects that are peripheral to the direction of user pointing or interest onto the secondary haptic transducers. This gives the user a form of "peripheral vision" for at least nearby objects that not exactly what the user is pointing at, but may be within a surface or region, such as a 45, 90, 120, or 180 degree region surrounding what the user is pointing at. In this embodiment, the invention would be configured to map haptic signatures from at least these near pointing region objects onto the secondary haptic transducers. (Note that often the invention will also map at least haptic signatures from those nearby objects that the user is pointing at to the primary haptic transducers.)

As previously discussed, the fingers (and presumably the thumb) are particularly good at detecting a finer level of details, such as textures and hard/soft edges. Thus, as previously discussed, in some embodiments often at least some of the various haptic transducers comprise primary haptic transducers that are configured to provide haptic input to at least one finger or thumb of the user.

When both primary and secondary haptic transducers are employed, the invention can be configured to produce the following combined effect:

1. The secondary transducers can be used provide the overall, coarse, perception of the user's environmental region surrounding the narrow surface that the user is pointing at. This provides an analogy to "peripheral vision" that provides at least some information pertaining to the spatial location and depth of nearby objects/surfaces adjacent to the pointing direction.

2. The primary transducers provide the finer perception of the shapes and depths of the object/surface directly pointed to by the user. Again, this is not unlike the region of vision where the vision is sharpest.

As an alternative, the invention can also be considered to be operating in a manner that is analogous to that of a narrow field high-power telescope and its broader field finder scope. The primary transducers are analogous to the narrow field high-power telescope, and the secondary transducers to the broader field finder scope. The secondary transducers can help the user at a macro—"zoomed out"—level to find nearby objects/surfaces to interact with, while the primary transducers provide detailed—"zoomed in"—shape and depth information about that object or surface. Of course unlike the analogy, the invention allows both the primary and secondary transducers to work together simultaneously.

Alternative Device Implementations

As previously discussed, in addition to an embodiment of the device in the form of three physical units comprising the vision system, the CCU and the haptic system, many alternate physical implementations are also possible. These can include:

1. A device with one physical unit worn on the user's hand (the haptic system), in which all components (video sensors, pointing sensors, computer processors, haptic transducers) are implemented.

2. A device with two physical components comprising the vision system and the haptic system. Here the various device computer processors (the CCU) can be implemented in one of the vision system or haptic system components or spread into both components.

3. An alternative device with two physical components, comprising a haptic system with video sensors, and the CCU. Here pointing sensors can be on either or both of these two physical components.

One of the alternate implementations for the device (item #3 above) is to combine both the vision and haptics components into one vision/haptic system that can be worn on the user's hand. In this implementation, there are only two main components of the device: the CCU (central computing unit), and a combined vision/haptic system.

Figure 4A:
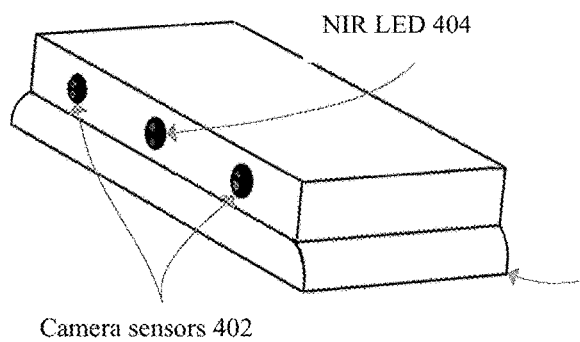
FIG. 4A, FIG. 4B show an embodiment that combines vision and haptic system in one component.
Figure 4B:
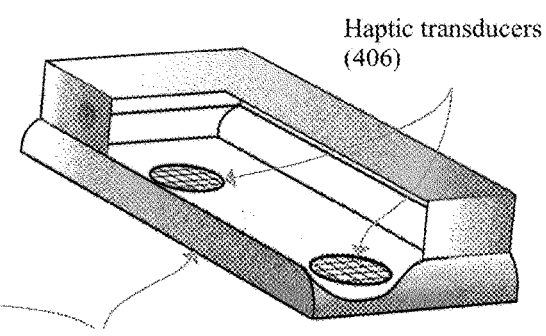

FIGS. 4A and 4B shows an alternative embodiment of the invention that combines the vision and the haptic systems in one assembly.

FIG. 4A shows a solid view of an alternative enclosure (400) assembly where the system's video cameras (402) and an optional near infrared (NIR) illumination LED (404) are visible. FIG. 4B shows a cut-out view of the same enclosure (400), here showing haptic transducers (406) that installed at the base of the enclosure. When worn over the hand (similar to FIG. 3), the haptic transducers at the bottom of the enclosure will touch the skin as desired, while the cameras will point to the front of the hand so that when the user points the hand at an object/surface, cameras will also point at the same object/surface. In this embodiment, the pointing sensors can comprise the video camera sensors. Alternatively, as previously discussed, the pointing sensors can be other types of sensors, such as accelerometers, gyroscopes, and magnetometers, as well.

Even in the embodiments where a single enclosure holds both the vision system (video cameras) and the haptic system (haptic transducers), as well as an optionally separate CCU), the pointing device can be formed from position sensors from any of the haptic system, vision system, or other systems.

In both of the above alternate implementations, the 2D image and depth map captured on such a combined vision/haptic system will now always naturally have a pointing direction center around the object that the user is looking at or pointing to.

Modes of Operation

According to the invention, the user can point at an object by either moving the user's hand (pointing sensors mounted on the hand mounted haptic system), or by moving the user's head (pointing sensors mounted on, or using video data from, a head mounted vision system). The invention's software can, in some embodiments, be user configurable so that the user can select how they want to point to the objects. Additionally, the invention can be configured to provide various main modes of operation to tailor the device according to the user's preferences.

Primary or Default (e.g. Shape and Depth) Perception Mode

In one embodiment, the invention can be configured so that the default method of operation is to operate as a shape and depth perception device. In this embodiment, the invention's primary haptic transducers generate the haptic effects for shape and depth perception of the currently pointed at object/surface, while at the same time, the invention's secondary transducers can be configured to provide the macro-level spatial location and depth of other nearby objects/surfaces in the pointing region proximate (peripheral to) to the pointing direction.

In this mode, the invention may be configured so that it is possible disable or even omit the secondary transducers if the user doesn't want the simultaneous macro-level perception of other nearby objects peripheral to the object that the user is pointing at. In other words, the user can turn off or omit the "peripheral vision" option.

Alternative or Macro-Level (Wide Angle View) Perception Mode

In this embodiment, the ability of the invention to detect object shapes may be omitted or disabled, and instead both the primary and secondary transducers may be used (e.g. their output may be combined) to provide a wide angle (macro-level) "view" of the spatial location and depth of nearby objects. The user may want to select this mode to, for example, to scan the scene at a wide angle "zoomed out" level to get a higher-level sense of the objects in the user's environment, before switching to the default operating mode that also presents the shape of at least the nearby objects that the user is pointing at.

In some embodiments, the invention may be configured so that in this mode, it is possible to disable either the primary or secondary transducers depending on the preference of the user.

Further Discussion of Algorithms and Methods

The invention will typically be configured so that it can process the visual information from the video sensors, and produce haptic feedback for the haptic transducers such that information pertaining to the shape and relative location and/or depth of various objects can be perceived by the user without requiring that the user directly or indirectly touch the various objects.

In some embodiments, additional haptic transducers, such as additional pairs of haptic transducers, can be used to provide coarse haptic feedback of the spatial location and/or depths of other nearby objects/surfaces.

Put alternatively, in some embodiments, the invention may use its at least one computer processor to determine any of a distance and direction to any of the far pointing direction objects (objects beyond a preset distance, such as greater than 30 feet away, that the user is pointing at), far pointing region objects (objects beyond this preset distance, that are in a 45 degree, 90 degree, 120 degree region spanning the direction that the user is pointing at), near pointing direction objects (objects within a preset distance, such as nearer than 30 feet away, that the user is pointing at), and near pointing region objects (objects within a preset distance, such as nearer than 30 feet away, that are in a 45 degree, 90 degree, 120 degree region spanning the direction that the user is pointing at.

These objects may often be large enough so that the system picks up various portions of the objects, rather than the object as a whole. The objects, or portions of the objects, may be labeled with, or their haptic signatures modified by, object location haptic signatures corresponding to at least portions of any of the far pointing direction objects, far pointing region objects, near pointing direction objects, and near pointing region objects according to the distance or direction to the object.

Thus in the door jamb situation, previously discussed, there may be a generic haptic signature that corresponds to a vertical linear object. This generic haptic signature can, in some embodiments, be further modified according to if the vertical linear object (door jamb) is (relative to the direction of user interest), to the right of the user, to the left of the user, along the direction of user interest, and either near (e.g. within 30 feet) or far (greater than 30 feet) from the user.

Main Processing Flow

Figure 5:
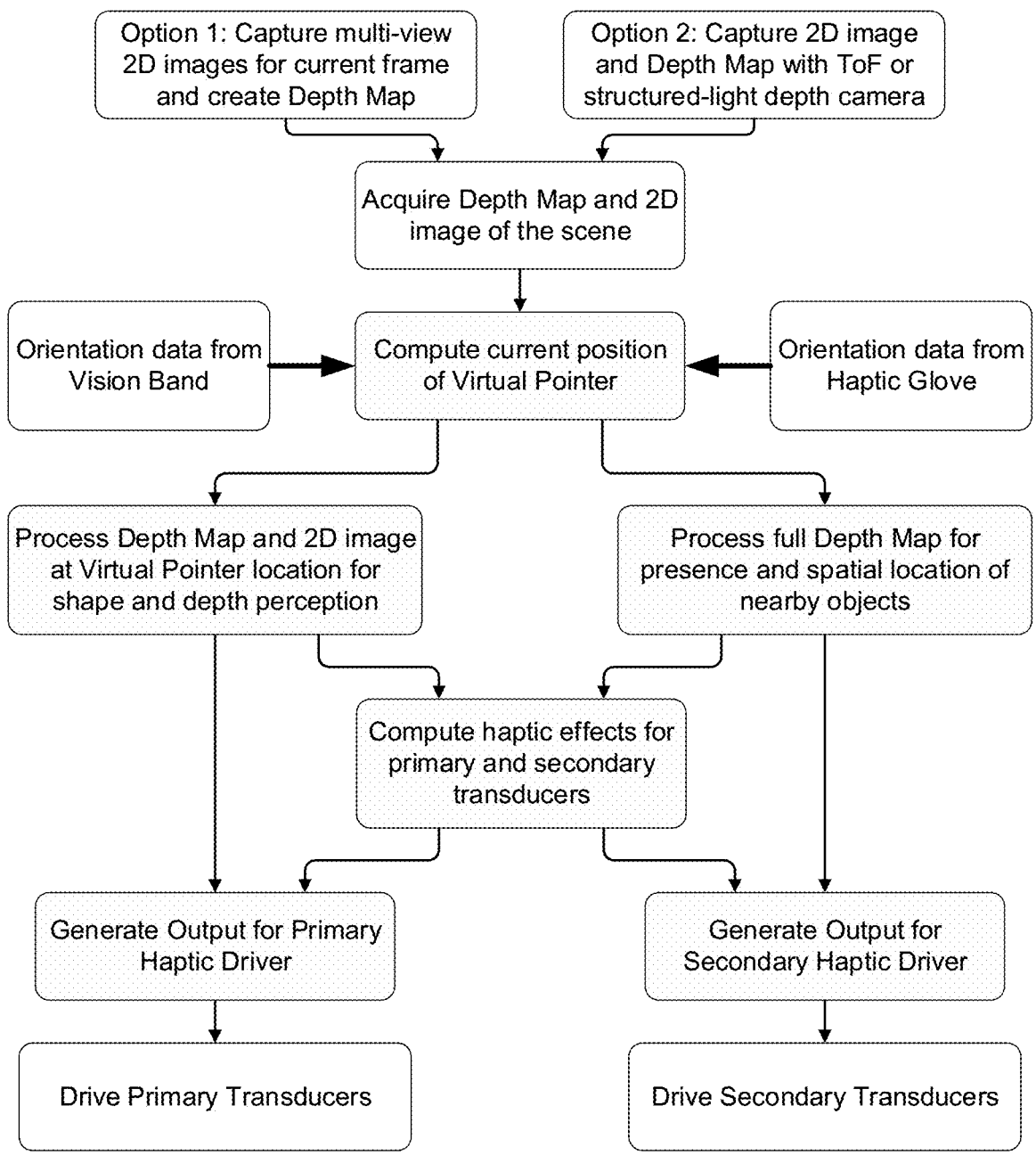
FIG. 5 shows a main processing flowchart.

One embodiment of how the invention's various algorithms can function is shown in the flowchart in FIG. 5. This main processing flowchart shows a high-level processing flow of the device as an example. The vision system can capture the video of the scene in front of the user using two or more 2D image sensors ("option 1") and send it to the CCU. As an alternative ("option 2"), the vision system may directly capture the depth map and a reference 2D image of the scene using a ToF (Time-of-flight) or structured-light depth camera.

Depth Map Computation

The computation of depth map is often only required if the vision system itself doesn't provide it directly.

A depth map may be computed from multiple two-dimensional (2D) images coming from the vision system's video cameras on a per frame basis. This depth map can be viewed as a 2D array that contains depth information at every location. Thus a 2D image and its corresponding depth map, together provide full 3D information of the visible scene, and can thus be one type of 3D image.

FIGS. 6A, 6B show an example pair of stereo images from a first video camera (sensor A, FIG. 6A) and a second video camera (sensor B, FIG. 6B). The corresponding depth map calculated from them is shown in FIG. 6C.

In the depth map image shown in FIG. 6C, objects closer to cameras appear darker (smaller distance=darker pixels) and objects farther from cameras appear brighter (larger distance=brighter pixels). Note that in FIGS. 6A and 6B, the images are "rectified" images; here the system's computer processor has calibrated them (using video sensor calibration data) to remove distortion and make the video images from both video cameras correlate with each other.

The depth maps can be computed using various methods previously discussed, including convolutional neural networks (ConvNets) or other type computer vision algorithms. Here, various OpenCV algorithms such as StereoBM (Stereo Block Matching) and SGBM (Semi-Global Block Matching), which are robust and easily usable, may be used.

Object/Surface Tracking Using Virtual Pointer Techniques

In a preferred embodiment, the invention can be configured to enable the user to simply point at an object or surface (without requiring touch) in the real world, and provide perception of shape and depth for that remote object/surface. When the user points to an object/surface in the real world, the invention can be configured to use pointing sensor data capture that information in the form of a virtual pointer (VP, pointing direction). As the user points to different parts of the scene or moves around, the invention can track the VP (pointing direction) dynamically. In other words, the VP (pointing direction) can simply be the location in the 2D image space that represents what the use is pointing at.

The various object/surface along the pointing direction (VP) can be rendered by the primary transducers for shape and depth perception (narrow angle or "zoomed in" view), while other remaining nearby objects/surfaces to the left and right (or up and down from) the (pointing direction) VP can be rendered by the secondary transducers for the location and depth perception at a macro level (peripheral vision, or "zoomed out" view).

As previously discussed, the cameras inside the vision system can be configured capture a scene within a certain angular field of view (FOV, pointing region). This represents the 3D world that the camera sensor(s) can "see" through their lens system. This 3D FOV (pointing region) then gets captured as one or more 2D images (optionally with depth information in the form of a depth map).

As one specific example of how the device can be configured to operate, we define a virtual pointer (pointing direction, VP) as a 2D coordinate within the FOV (pointing region) of the Vision System, which here is approximately 45 degrees wide in both width and height. The pointing direction (VP) can be used to represent the 2D location in the scene pointed to by the Haptic System within this FOV.

FIGS. 7A, 7B, 7C, and 7D visually demonstrates this concept of the FOV (pointing region) and the virtual pointer (direction of pointing)

Figure 7A:
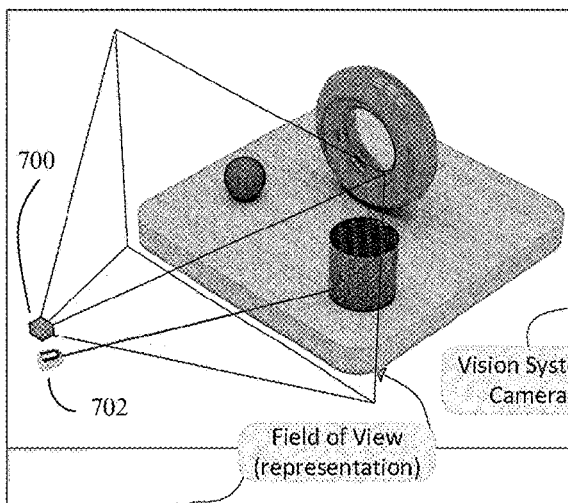
FIG. 7A, FIG. 7B, FIG. 7C, and FIG. 7D show an embodiment of the invention's haptic system as a pointer affecting the virtual pointers for the same field of view (FOV).
Figure 7B:
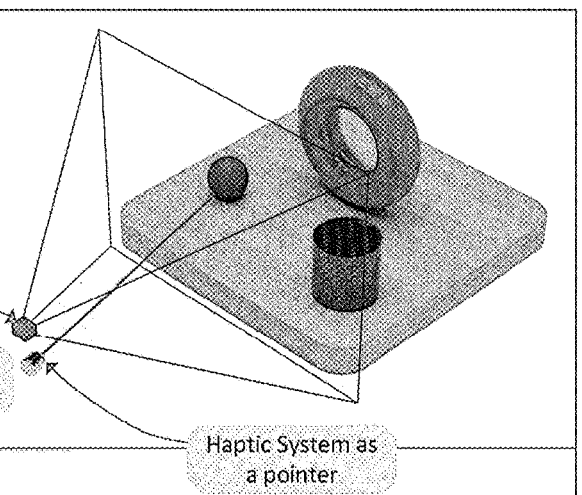
Figure 7C:
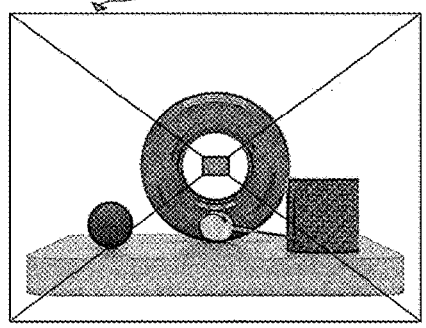
Figure 7D:
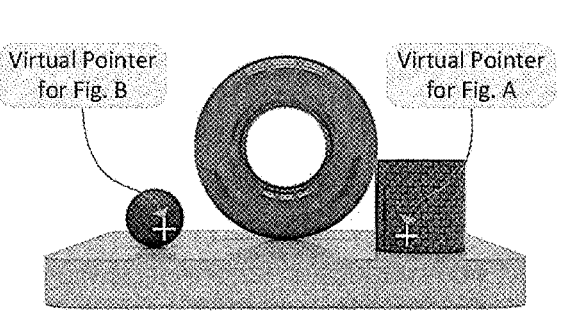

In the illustration of FIG. 7A-7D, FIG. 7A-through FIG. 7D) show a 3D scene comprising a donut, a sphere and a cylinder on a platform. Here the video cameras in the vision system (here represented by a rectangular box) are always aimed at the center of the donut.

Of course, this is just an artificial representation of a real-world scene for illustration. Here the human user, who is wearing the vision system and the haptic system, is not shown to keep the illustration simple. The pyramid like projection out of the box (i.e., the vision system video cameras) illustrates the 3D field of view (FOV) or pointing region that the vision system can "see". In this diagram, assume that the user has a head mounted vision system such as (102), and the pointing sensors are mounted on a glove like device such as (106). Thus for a blind user, the direction of pointing and the direction of the video images will often not exactly coincide, although they will generally be somewhat correlated (e.g. even a blind user will turn around to examine objects behind them). This scenario is discussed in more detail below.

FIGS. 7A-7D show use of the inventions haptic system (pointing sensors) to determine pointing directions affecting the virtual pointers for the same FOV FIG. 7C shows a front view of the same scenes previously shown in FIGS. 7A and 7B. Here one can see the extent of the FOV (pointing region) that will be captured (in the form of the rectangle projected from the cameras (700), which may be head mounted cameras). FIG. 7A and FIG. 7B show the same scene; however, here the pointing sensors may be mounted on a glove mounted haptic system (represented by the bullet-and-a-stick pointer 702), and thus may point at different objects relative to the camera(s). Note that the pointing direction will generally be within the field of view, so that the field of view (pointing region) surrounds the pointing direction, but usually not to an equal extent on all sides. That is, the pointing direction can be off-angle to the pointing region (field of view).

In FIG. 7A, the haptic system (such as a glove mounted haptic system with pointing sensors 106) points to the cylinder, whereas, in FIG. 7B, the user may have moved the hand and glove, and now the haptic system points to the sphere.

Finally, in FIG. 7D, the FOV captured as a 2D image is shown. Here the virtual pointers (VPs) corresponding to the pointing directions of FIG. 7A and FIG. 7B are shown as crosshairs on the cylinder and the sphere respectively. In this illustration, we have not changed the camera's FOV (e.g. a vision impaired user with a head mounted camera may be looking in the same direction), while the VP locations change to track whatever the haptic system and pointing sensors (here assumed to be glove mounted) points to.

In this embodiment, both the vision system (video cameras) and the haptic system can move at least somewhat independently, and the virtual pointer (pointing direction) calculation will preferably be configured to take this into account and point to the right location within the captured video images. This adjustment can be facilitated if, for example, at least some of the position sensors (such as glove mounted position sensors) are themselves video cameras, since the system can then compare the video images from video camera type pointing sensors (perhaps glove mounted) with perhaps head mounted video cameras used to determine the FOV. As another example, the pointing sensors can also comprise low power laser pointers, and the video cameras used to determine the field of view can analyze the images for laser light. The system can also have independent position sensors on both the vision system and the haptic sensors, and perform suitable calculations to reconcile the two. This latter option is discussed in more detail below.

As the invention (device) starts up, it can be calibrated based on an assumption that a certain orientation of the haptic system and vision system will be considered centered (for example, both the vision system (video cameras) and haptic system (pointing sensors) pointing directly ahead in the same direction in front. Here, an initial calibration fixture can be used to ensure that this has occurred (e.g. hold the vision system video cameras and the portion of the device holding the pointing sensors in the same direction) so that even blind users could effectively calibrate the unit.

At this centered position, the system can assume that the virtual pointer (pointing sensor) has a direction of (0, 0): i.e., the distance from the center in both X and Y axis is zero. In some embodiments, the invention (device) can also provide a VP reset button to reset this center location. The user can point the vision system (video cameras) and haptic system (pointing sensors) to a comfortable position (here a fixture may be used if needed), and press the VP reset button for the device to reset the virtual pointer to this center location, i.e., to (0, 0). The VP reset button can be provided to allow the user to select the starting center position of the device components that is comfortable for them.

From then on, the movement of the haptic system (pointing sensors) to the left, right, up or down—in fact, any movement projected on a two-dimensional vertical plane—from this position can be used to calculate the new value of the virtual pointer (pointing direction) inside the FOV space. The movement can be mapped using a linear formula such that a movement of certain physical units of the Haptic System will translate into the distance in terms of certain number of pixels inside the FOV space. This calculation will take into account the horizontal and vertical movement as well as the rotation angle of the Haptic System.

Note that the calculation of VP (pointing direction) is not required when the vision system itself incorporates pointing sensors and thus can also be used as a pointing device. In this situation, the location of the VP is always at the center, (0, 0) or other known coordinate. Thus the above VP calculations are usually only required when the pointing sensors can move relative to the location of the video cameras, such as when the pointing sensors are on a haptic system glove or other device.

In situations where the virtual pointer is assumed to be at location (0, 0) of the FOV, a virtual pointer (pointing direction) can be represented as $(X_p, Y_p)$ where $X_p$ and $Y_p$ are the distances from center of the FOV on horizontal and vertical axes respectively. In a generic form, for $$VP = (X_p, Y_p),$$

$$X_p = X_a \times C_x, \text{ and } Y_p = Y_a \times C_y.$$

In the above equations, $X_a$ can be the actual physical distance of the haptic system (pointing sensors) on the horizontal axis from the center of the FOV, and $Y_a$ can be the actual physical distance of the haptic system (pointing sensors) on the vertical axis from the center of the FOV. Here orientation angle, $C_x$ and $C_y$ are constants that can be used to scale or map the physical distance into the pixel units of the FOV. In some embodiments, these constants can be decided empirically to allow specific distance or rotation of the pointing sensors without going out-of-bounds with respect to the FOV space. The physical distance of the pointing direction from the center of the FOV can be calculated using various methods, including pointing sensor accelerometer and gyroscope outputs from any haptic system pointing sensors.

Note that, theoretically, the horizontal and vertical axes can be defined in many different alternative ways. The preferred and arguably, natural way is to define the horizontal and vertical axes to match that of the real world. In this case, the horizontal movement of the pointing sensors and pointing direction will correspond to the real world horizontal movement. If the vision system video cameras are tilted, the images that are result of such a tilt can be first corrected to match the real-world horizontal/vertical axis orientation, and then used to calculate the VP and haptic effects. This is a physically realistic implementation as it allows user to have bearing of the real world and point or scan the objects and surfaces in an intuitive manner.

VP=(0, 0) means that the Haptic System is pointing exactly in the center of the view captured by the vision system (video cameras). This is also the condition when the user presses the FOV reset button if such a button is provided on the device. As noted earlier, when Vision System is selected as the pointing device, VP is known, and is usually defined as being centered at (0, 0).

It is important to note that if the vision system (video cameras) and the haptic system (pointing sensors) are implemented as two separate physical components that can move independently of one another, then both can have full freedom of movement with respect to each other. For example, as previously discussed, while the vision system video cameras (assumed here to be on the user's head) may be stationary or moving in a first direction, the haptic system motion sensors (here assumed to be mounted on the user's hand) may be moved by the user in a second direction to point to various objects/surfaces of the visible scene, usually more or less in front of the user.

Conversely, the motion sensors mounted on the user's hand may be stationary, while the video cameras mounted on the user's head move in a different direction. In either case, the invention can use various methods, such as the calculation of the virtual pointer as described above, to ensure that the object or the area of the scene that the user is pointing to is correctly identified within the FOV (pointing region) space.

While the illustrations in 7A-7D showed a scenario where the vision system (video cameras) remained unmoved while the haptic system (pointing sensors) changed orientation, the illustrations in 8A-8D show a scenario where the haptic system (pointing sensors) remains unmoved while the vision system (video cameras) pivot.

In the left "original" column (FIGS. 8A and 8C), the scene is identical to the scene in the earlier illustration of 7A and 7C. Here FIG. 8A gives an overhead view, while FIG. 8C gives a perspective view. FIGS. 8B and 8D show the right "camera pivoted" column. In FIG. 8B, the vision system (video cameras) are pivoted 10 degrees relative to their orientation in FIGS. 8A and 8C.

The purpose of this illustration is to show the effect of such a video camera movement on the calculation of the virtual pointer (pointing direction). In this illustration, the orientation of the haptic system (pointing sensors) are unchanged relative to FIGS. 8A and 8C to show the effects of this video camera movement on the calculation of the virtual pointer (pointing direction) when the user is apparently interested in the same object, even while the video camera moves. In this situation, the invention can be configured adjust for this video camera movement. Thus in this situation, although the invention may report somewhat different near pointing region objects and different far pointing region objects, and report this as differences on the output of the secondary haptic transducers, the invention can be configured to report the same near pointing direction objects, and the same far pointing direction objects, and report at least the same near pointing direction objects on the invention's primary haptic transducers.

FIGS. 9A and 9B show the images captured by the cameras corresponding to the 3D views shown in FIGS. 8C and 8D. FIG. 9A is the FOV capture for FIGS. 8A and 8C, and FIG. 9B is the FOV capture for FIGS. 8B and 8D. This example illustrates how the FOV has changed due to the pivot of the camera. Note that in this example, the FOV center in both images (FIGS. 9A and 9B) focuses on different parts of the 3D scene in each of FIG. 9A and FIG. 9B.

FIGS. 9A-9B effect of vision system (video camera) pivot on the virtual pointer (pointing direction).

As can be seen, the invention can be configured so that the virtual pointer (pointing direction) still tracks the same place on the sphere in both FIG. 9A and FIG. 9B. The computation takes care of moving the virtual pointer closer to the center in FIG. 9B due to the (opposite) movement of the video cameras. In this case, the difference in the FOV center between the two images will, for example, be proportional to the orientation change output of pointing direction sensors such as accelerometer/gyroscope sensors. In other words, to calculate the new position of the virtual pointer in each frame, we can use a first set of pointing sensors (or image analysis algorithms) to determine the orientation of the visual system video cameras, and use a second set of pointing sensors (such as the previously discussed glove mounted haptic system) and use this information to calculate the new value of the virtual pointer (pointing direction). For example, the system can add the differences to the current value to calculate the new value of the virtual pointer.

For example, given the current virtual pointer $(X_{cur}, Y_{cur})$, the new virtual pointer $(X_{new}, Y_{new})$ for the new frame can be calculated by the invention's computer processors as follows:

$$X_{new} = X_{cur} | C_{vision} O_{x_{vision}} | C_{haptic} O_{x_{haptic}}$$

$$Y_{new} = Y_{cur} + C_{vision} O_{x_{vision}} + C_{haptic} O_{x_{haptic}}$$

Where $O_{x_{vision}}$ and $O_{y_{vision}}$ are the changes in orientation of the Vision System, $O_{x_{haptic}}$ and $O_{y_{haptic}}$ are the changes in orientation of the Haptic System. All orientation values are signed quantities. The constants $C_{vision}$ and $C_{haptic}$ can be used to scale the values to convert the real movement into the movement in terms of pixels inside FOV space and can be selected empirically or by some sort of distance calibration of the involved sensors.

Typically, at least over a time interval of about a second, a user can move their hands more than they can swivel their head. Since, for example, the invention's vision system (head mounted video camera) may thus have a FOV that can, over a small time interval not change very much in FOV angle. By contrast, a user can swing their arms quickly, and thus in the case of a glove mounted haptic system with pointing sensors, can more freely. For example, a user might even point their hand behind their head.

It is thus possible that the virtual pointer (pointing direction) may occasionally go outside of the FOV space boundary captured by the vision system's cameras. If such a condition arises, a special haptic output can be produced to let the user know that the haptic system (pointing sensors) are out of bounds, and/or provide other suitable haptic outputs to direct the user towards the FOV space of the video cameras.

Using a Virtual Pointer (Pointing Direction) to Create Different Haptic Perception (Haptic Outputs)

In some embodiments, the location of the virtual pointer within the FOV space can be used to identify a small patch within the Depth Map and the reference 2D image. This small patch will be referred to as the "image patch", and alternatively it can also be considered to be the narrow angle surface encompassing the pointing direction. This image patch (narrow angle surface encompassing the pointing direction) can be used for calculating the shape and depth of the particular object in this "image patch". When expressed in the alternative "narrow angle surface encompassing the pointing direction" terminology, this surface can be any of a 1 degree, 2 degree, three degree, 4 degree, 5 degree even 10 degree angle, both in a horizontal direction, and also in a vertical direction, surrounding the pointing direction.

Based on what objects or portions of objects are found in the "image patch", and the properties of these objects or portions of objects, the system can then generate haptic signatures (haptic feedback effects) by selecting from a library of effects (database of haptic signatures). As previously discussed, this library/database can either be stored in advance, or alternatively synthesized/generated at run-time.

The algorithm to select the haptic effects (haptic signatures) can take into account both the present pointing direction (location of the virtual pointer), and optionally changes or movement in the present pointing direction. Taking such changes into account can be useful to enhance the haptic effects (signature) for portions of objects such as edges, corners, gradients, curvatures, etc. of the object or surface.

If the vision system (video cameras) and the haptic system (pointing sensors) are both stationary (analogous to a user physically touching an object and not moving the hand thereafter), the haptic perception can be less effective as shape perception often relies on integration of somatosensation coming from different parts of the object—similar to how we move our hand around an object or surface to understand or perceive shapes. This is true for both the physical touch and remote perception through haptic feedback. This is less of an issue when multiple primary transducers are used, especially when multiple finger mounted primary haptic transducers are used. Use of multiple finger mounted haptic transducers allows the system convey shape information without hand movement to a certain degree, because the system's computer processors and algorithms can be configured so that different transducers can mimic different depths, orientations or curvatures by producing synchronized coordinated haptic effects. Generally, however, for hand mounted haptic systems employing built in pointing sensors and finger mounted primary haptic transducers, movement of the hand will enhance the shape perception.

The invention described in this disclosure is thus configured to mimic how humans use touch to perceive object shapes. Here the invention's users can be also trained as to how to get the best perception out of the device. For example, a slow and steady movement of user's hand will provide detailed perception while fast movement of the hand may break the immersion.

In addition to the shape cues, the cues for depth or distance to the object can be provided by changing the pitch or repetition speed of playback of the haptic effect (or both) in proportion to the distance of the object from the user.

Haptic Perception

As previously discussed, the haptic system can comprise one or more haptic transducers. At least some of these various haptic transducers can be configured in different ways to provide better perception of the shapes and depths of the objects or surfaces pointed to by the user.

In some embodiments, the haptic signatures (haptic effects) can be configured so that depth (distance from the user) information can be encoded by increasing or decreasing the intensity of a base haptic effect as a function of time. Optionally, or additionally, the pitch or repetition speed of a base haptic signature can also be changed to provide information pertaining to changes in depth (distance from the user). For example, the intensity or pitch of the base haptic signature can be increased as the object/surface gets nearer to the user; conversely, the intensity or pitch of the base haptic signature can be decreased as the object/surface is farther from the user.

It can be important to provide finer and more subtle cues to changes in the depth for the shape perception to be effective for pseudo-3D perception of nearby objects/surfaces. To enable perception of both the shape and the depth of these nearby objects/surfaces, in some embodiments, the invention's haptic transducers can be configured to provide both a large dynamic range of distance effects, and also some fine scale distance effects. This enables the system to provide information on both the distances to the objects, and also the impact of the objects shape as more minor variations on the overall distance. This allows the user to obtain haptic information on how far away the object (or portion of the object) is, and also the shape of the object In some simpler embodiments of the invention, the shape perception can be implemented using only the depth (distance to object) information. Here the image patch around the virtual pointer can processed to find out the depth (distance from the user) which can be communicated using at least one haptic transducer, such as a secondary haptic transducer, and no additional shape information may be presented.

However the shape of the object (or portions of the object) will cause small perturbations in the depth to various portions of the object, relative to the average distance to the object. Here, higher fidelity haptic effects (haptic signatures), which can be output using primary haptic transducers, can be used to render these subtle perturbations in the depth to various portions of the object. In some embodiments, the primary haptic transducers may output haptic signatures corresponding to both the average distance to that portion of the object, as well as small perturbations in the object, thus relaying both distance and shape information.

In other embodiments, to provide a more elaborate and immersive shape perception, the image patch can be processed to find out supplementary information about the shape of the object/surface. For example, certain shape features such as edges, corners, gradients and curvatures can be identified in the image patch. This information can then be optionally be combined with depth information (as described in the previous paragraphs) to finally convey the shapes and optionally also the distance information to the user. In this method, the different identified features can be represented by different haptic effects to enhance the shape perception.

In some embodiments, multiple primary haptic transducers can be implemented. These multiple primary haptic transducers can be controlled by the system computer processor so that each can correspond to a different spatial location within the small patch around the virtual pointer (image patch). The features at each of these locations can then be detected/identified and suitable haptic effects (haptic signatures) can be generated for each of the multiple primary transducers so that information regarding the shape of multiple spatial locations within the small patch can be presented to the user. This embodiment is shown in more detail in FIG. 10.

FIGS. 10A and 10B show an example of how the invention can use multiple haptic transducers to output haptic signatures corresponding to multiple spatial locations on a small patch of an object or object portion.

FIG. 10A shows an example of a 3×3 array of haptic transducers containing 9 transducers labeled A1 to C3. In some embodiments, the invention (e.g. computer processor) may be configured to cause each of these different transducers A1 . . . C3 to output different haptic signatures according to how the transducers may to different spatial locations on the image patch shown in FIG. 10B. Here transducer A1 maps to the shape of spatial location A1 on the image patch A1, transducer A2 maps to the shape of spatial location A2 on the image patch, and so on. This can be done using various algorithms, examples of which are shown in FIG. 11 and discussed below.

Figure 11:
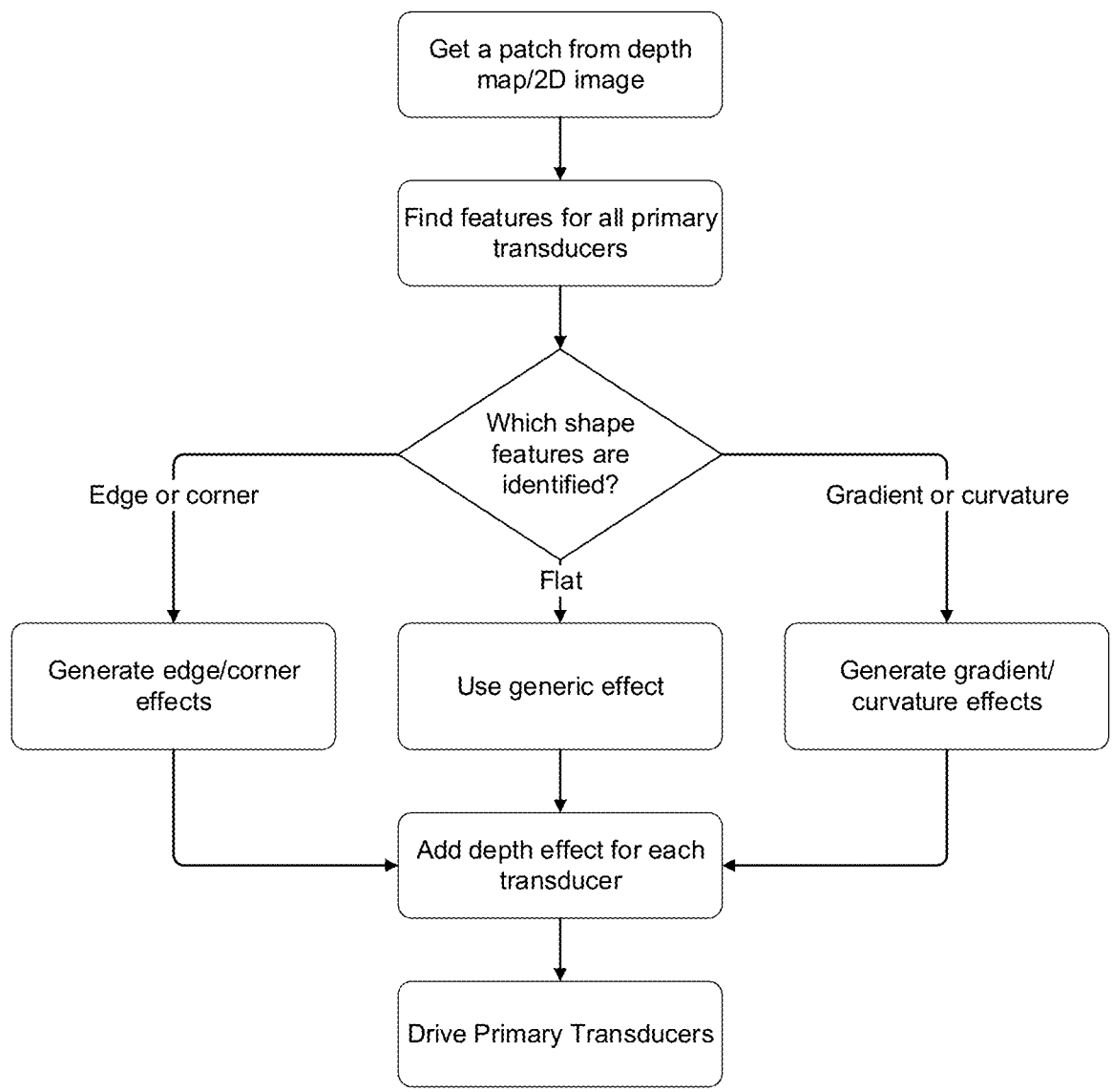
FIG. 11 shows an algorithm for creating haptic effects utilizing shape features.

FIG. 11 Algorithm for creating haptic effects (haptic signatures) utilizing shape features In some embodiments, feature/shape identification can be arranged for at least each primary haptic transducer that is implemented in the device.

FIG. 11 shows this algorithm in the form of a flow chart. In some embodiments, such as embodiments where only one haptic transducer is used, only one feature at the center of the image patch needs to be identified. In other embodiments, such as embodiments, with a plurality of haptic transducers the computer processor(s) can (for example) map the physical placement of these haptic transducers to various 2D spatial locations inside the image patch. Features, such as textures or shapes within these spatial locations within the image patch, can be identified and corresponding haptic effects (haptic signatures) selected for the various haptic transducers based upon what features/textures are detected. Thus, for example in FIGS. 10A and 10B, nine features from nine spatial locations can be detected and haptic effect (haptic signatures) of each feature can be rendered by the corresponding haptic transducer.

In some embodiments, an additional haptic effect for depth or distance (haptic distance effect) can be added, combined, or multiplexed with each haptic shape effect. This allows the user to detect both the object's distance from the user, as well as the shape various sections of the object. The overall effect of is intended to mimic the effect that a human user might experience if they touched an object's surface with one or more fingers. Indeed, in some embodiments, since fingers (e.g. finger pads and finger tips) are particularly sensitive to closely spaced haptic signals, an array of haptic transducers may be used for each finger or fingertip. This would allow even better perception of object shape resolution.

For example, as the user's hand may initially point to a wall and then move along it, an effect representing a gradient of depth can be rendered. As the user continues to move the hand, and if at one point crosses over to an opening (e.g. open door), this represents crossing an edge. To enable the user to perceive this, after playing the gradient effect (representing the wall), an effect (haptic signature) representing an edge (e.g., a brief "click") can be rendered, followed by an effect representing the flat surface or gradient at long distance (due to the open door) can be rendered. When these haptic effects are integrated by brain over the time, it will provide the appropriate perception of the wall and then the opening due to the door. This example also highlights how the movement can enhance the shape perception: the movement allows the device to choose a wider range of effects to provide better perception of various shapes.

These various haptic effects can be determined by empirical experiments to find the most natural haptic effects for each shape feature. In terms of implementation, these effects can be synthesized at run time by onboard computation, or they could be pre-computed and stored in a non-volatile storage media for later retrieval during active usage.

As previously discussed, these various "haptic effects" or "haptic signatures" can be thought of as either residing in a database of haptic effects or signatures, or alternatively can be calculated from scratch using various haptic signature creation and algorithms. This is much the same way that the effect of any algorithm can be represented either as the algorithm itself, or as a lookup table or database. For the purposes of this disclosure, we will use the term "database of haptic signatures" to denote the various ways of generating various effects/haptic signatures, and the term "database" in this context is not intended to be limiting. Any method of generating the various haptic effects or signatures is considered covered by this "database of haptic signature" terminology.

Further Depth Map Discussion:

FIG. 12A shows the depth map of the scene shown earlier in FIG. 7D and FIG. 9A. In this depth map, those objects or surfaces that are closer to the video cameras (worn by the user) are darker (representing smaller distances), and the farther objects or surfaces are brighter. The further distances are represented as white.

Recall that in corresponding FIG. 7D, the virtual pointer (pointing direction) in this scene was found to be on the sphere. In FIG. 12A, this same virtual pointer is now overlaid on the depth map, and the small box around represents the image patch (narrow angle surface). This image patch around the virtual pointer is shown enlarged in FIG. 12B.

FIG. 12C shows a further computer processor enhanced version of this image patch. This helps to highlight spherical shape of this object, and this shape can also be rendered using various haptic transducers as discussed above. Here, for example, the invention may analyze the shape of this object against various reference shapes, and use this matching to a reference shape to pick the appropriate haptic signature to render this shape. The computer algorithms can use many other techniques to find the shape features—in this case the curvature of the sphere.

Embodiments with Multiple Primary Haptic Transducers

As described above, the shape perception can be achieved by selecting various haptic effects to render on a single haptic transducer. Optionally, multiple haptic transducers on a single finger, and/or multiple transducers on multiple fingers can be added to further enhance the shape perception.

As previously discussed, an array of haptic transducers on each finger can be used to enhance the shape perception even further. This array may comprise electroactive polymers in the form of a film containing an array of haptic transducers—each capable of individual control for amplitude and pitch.

More transducers allow for mimicking the way the human hand (and fingers) work. The tip of the finger can detect gaps, edges, curvatures etc. with or without movement. Using multiple transducers on a single finger can take advantage of this. Similarly, multiple fingers can recognize the shape better and/or faster. Using transducers on multiple fingers can take advantage of that.

Reducing Jitter or Jerkiness

As the user walks, this can typically introduce jitter or jerkiness in the images captured by the vision system's video cameras, —whether these cameras are worn on the head or on the hand as part of the haptic system. Even without the vision system camera movement, the haptic system (or the hand) movement itself may be unsteady or jittery. This jitter can make the virtual pointer calculation less robust, and 'jumpy', and may create an unpleasant user experience instead of an immersive shape perception.

In some embodiments, to reduce this problem, and to help ensure that the virtual pointer remains steady or has smooth movement, various image stabilization computer vision algorithms can be used to reduce this jitter. Various optical image stabilization techniques can also be used in the vision system to provide stable images. In some embodiments, these image stabilization algorithms can use the accelerometer/gyroscope readings from any of the vision system video cameras and haptic system to stabilize virtual pointer computation per frame, and reduce the jitter from frame to frame jumpy movement. Such techniques can allow the virtual pointer to move smoothly over the object/surface and provide a more immersive experience for the user.

Texture Detection and Texture Perception

As previously discussed, texture is very useful to provide better understanding of the object to the user. Human tactual (or tactile) systems are inherently able to detect a wide range of different textures. We can take advantage of this fact to, in addition to the shape and depth perception cues, also add texture detection and texture perception to the system to increase the accuracy and sensory immersion for the user. Once the type of texture is detected (e.g., smooth surface, cloth-like texture, rough sand-like texture, etc., to name a few types), the system can also automatically generate various special haptic effects (signatures) to convey this information to the user as well.

The invention claimed is:

1. A method of visual assistance for a human user in an environment, said method comprising:

using a plurality of user worn video sensors to acquire 3D images of said environment, said environment comprising a plurality of different objects, each different object comprising an object shape and a different 3D object location;

using at least one pointing sensor to determine a virtual pointer and a pointing direction comprising a narrow angle surface encompassing said virtual pointer, and a field of view (pointing region) comprising a wider angle surface surrounding said pointing direction and said narrow angle surface;

a) distance analyzing, using at least one computer processor, computer vision distance algorithms, and said at least one pointing sensor, said 3D images of said environment to identify, along said pointing direction and pointing region, and relative to the location of said user: far pointing direction objects, far pointing region objects, near pointing direction objects, and near pointing region objects;

b) using said at least one computer processor, and a database of haptic signatures, to assign object location haptic signatures to any of said far pointing direction objects, far pointing region objects, near pointing direction objects, and near pointing region objects; and mapping, using said at least one computer processor and a plurality of spatially separated user worn haptic transducers, said object location haptic signatures onto haptic outputs of said haptic transducers;

wherein at least some of said haptic transducers comprise primary haptic transducers;

further analyzing a shape of at least said near pointing direction objects, using said at least one computer processor and computer vision image recognition algorithms, at least portions of said near pointing direction objects against reference shapes, and assigning corresponding reference shapes to at least portions of said near pointing direction objects;

each reference shape having a corresponding shape haptic signature, said corresponding shape haptic signature selected from said database of haptic signatures;

using said at least one computer processor, said corresponding reference shapes, and said database of haptic signatures to assign at least one object shape haptic signature to at least said portions of said near pointing direction objects; and mapping, using said at least one computer processor and said haptic transducers, said object shape haptic signatures onto haptic outputs of said primary haptic transducers.

2. The method of claim 1, wherein said haptic transducers comprise primary haptic transducers and secondary haptic transducers, further using said at least one computer processor to map object location haptic signatures from at least said near pointing direction objects onto said primary haptic transducers.

3. The method of claim 1, wherein said haptic transducers comprise primary haptic transducers and secondary haptic transducers, further using said at least one computer processor to map object location haptic signatures from at least said near pointing region objects onto said secondary haptic transducers.

4. The method of claim 1, wherein said computer vision distance algorithms comprise stereo image rectification and depth map computation algorithms; and said computer vision image recognition algorithms comprise any of geometric modelling methods, convolutional neural network methods, and single shot multibox detection SSD frameworks.

5. The method of claim 1, wherein said video sensors are spatially separated video sensors configured to be worn on a head of said user.

6. The method of claim 1, wherein said haptic transducers comprise at least two haptic transducers, comprising any of:
f) eccentric rotating mass transducers;
g) linear resonance array transducers;
h) piezo transducers;
said haptic transducers configured to produce detectable haptic sensations on a skin of said user.

7. The method of claim 1, wherein at least some of said haptic transducers and said at least one pointing sensor comprise at least one glove type device, covering a portion of said user's hand, that is configured to be worn on a hand of said user.

8. The method of claim 7, wherein at least some of said haptic transducers comprise primary haptic transducers configured to provide haptic input to at least one finger or thumb of said user.

9. The method of claim 8, wherein at least some of said haptic transducers comprise secondary haptic transducers configured to provide haptic input to regions of said user's arm or hand that exclude said user's fingers and thumb.

10. The method of claim 1, wherein said at least one pointing sensor comprise any of at least one accelerometers, gyroscopes, magnetometers, or video cameras.

11. The method of claim 1, further using said at least one computer processor to determine a distance or direction to any of said far pointing direction objects, far pointing region objects, near pointing direction objects, and near pointing region objects; and further modifying said object location haptic signatures corresponding to at least portions of any of said far pointing direction objects, far pointing region objects, near pointing direction objects, and near pointing region objects according to said distance or direction.

12. A method of visual assistance for a human user in an environment, said method comprising:

using a plurality of user worn video sensors to acquire 3D images of said environment, said environment comprising a plurality of different objects, each different object comprising an object shape and a different 3D object location;

using a glove type device comprising at least one pointing sensor to determine a virtual pointer and a pointing direction comprising a narrow angle surface encompassing said virtual pointer, and a field of view (pointing region) comprising a wider angle surface surrounding said pointing direction and said narrow angle surface;

said glove type device also comprising at least one primary haptic transducer;

a) distance analyzing, using at least one computer processor, computer vision distance algorithms, and said at least one pointing sensor, said 3D images of said environment to identify, along said pointing direction and pointing region, and relative to the location of said user: far pointing direction objects, far pointing region objects, near pointing direction objects, and near pointing region objects;

b) using said at least one computer processor, and a database of haptic signatures, to assign object location haptic signatures to any of said far pointing direction objects, far pointing region objects, near pointing direction objects, and near pointing region objects;

c) further analyzing a shape of at least said near pointing direction objects, using said at least one computer processor and computer vision image recognition algorithms, at least portions of said near pointing direction objects against reference shapes, and assigning corresponding reference shapes to at least portions of said near pointing direction objects;

each reference shape having a corresponding shape haptic signature, said corresponding shape haptic signature selected from said database of haptic signatures;

using said at least one computer processor, said corresponding reference shapes, and said database of haptic signatures to assign at least one object shape haptic signature to at least said portions of said near pointing direction objects; and mapping, using said at least one computer processor, said object location haptic signatures onto haptic outputs of any of said primary haptic transducers and secondary haptic transducers, and mapping said at least one object shape haptic signature to any of said primary haptic transducers.

13. The method of claim 12, wherein said computer vision distance algorithms comprise stereo image rectification and depth map computation algorithms; and said computer vision image recognition algorithms comprise any of geometric modelling methods, convolutional neural network methods, and single shot multibox detection SSD frameworks.

14. The method of claim 12, wherein said video sensors are spatially separated video sensors configured to be worn on a head of said user.

15. The method of claim 12, wherein any of said primary haptic transducers and said secondary haptic transducers comprise any of:

f) eccentric rotating mass transducers;

g) linear resonance array transducers;

h) piezo transducers;

said primary haptic transducers and said secondary haptic transducers configured to produce detectable haptic sensations on a skin of said user.

16. The method of claim 12, wherein said at least one pointing sensor comprise any of at least one accelerometers, gyroscopes, magnetometers, or video cameras.

17. The method of claim 12, further using said at least one computer processor to determine a distance or direction to any of said far pointing direction objects, far pointing region objects, near pointing direction objects, and near pointing region objects; and further modifying said object location haptic signatures corresponding to at least portions of any of said far pointing direction objects, far pointing region objects, near pointing direction objects, and near pointing region objects according to said distance or direction.

* * * * *